(12) United States Patent
Komano et al.

(10) Patent No.: US 9,429,602 B2
(45) Date of Patent: Aug. 30, 2016

(54) PARTIAL INFORMATION GENERATING DEVICE, POWER USAGE AMOUNT CALCULATION SYSTEM, AND PARTIAL INFORMATION GENERATING METHOD

(71) Applicant: Kabushiki Kaisha Toshiba, Minato-ku (JP)

(72) Inventors: Yuichi Komano, Kawasaki (JP); Shinji Yamanaka, Shinagawa-ku (JP); Satoshi Ito, Setagaya-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 435 days.

(21) Appl. No.: 14/132,145

(22) Filed: Dec. 18, 2013

(65) Prior Publication Data

US 2014/0229128 A1    Aug. 14, 2014

(30) Foreign Application Priority Data

Feb. 12, 2013   (JP) .................................. 2013-024959

(51) Int. Cl.

| | |
|---|---|
| *G01R 21/00* | (2006.01) |
| *G01R 21/06* | (2006.01) |
| *G01R 21/133* | (2006.01) |
| *G06Q 50/06* | (2012.01) |
| *H04L 9/08* | (2006.01) |
| *G06Q 30/04* | (2012.01) |

(52) U.S. Cl.
CPC ............. *G01R 21/133* (2013.01); *G06Q 30/04* (2013.01); *G06Q 50/06* (2013.01); *H04L 9/085* (2013.01); *G01D 4/002* (2013.01); *G06F 21/6245* (2013.01); *Y02B 90/241* (2013.01); *Y02B 90/244* (2013.01); *Y02B 90/245* (2013.01); *Y02B 90/248* (2013.01);
*Y04S 20/32* (2013.01); *Y04S 20/327* (2013.01); *Y04S 20/40* (2013.01); *Y04S 20/52* (2013.01)

(58) Field of Classification Search
CPC .. G06F 1/3287; G06F 21/445; G06F 21/556; G06F 21/558; G06F 21/602; G06F 21/606; G06F 21/608; G06F 21/6245; G06F 21/76; G06F 2207/7219; G06F 2207/7257; G06F 3/013; G06F 7/723; Y04S 30/14
See application file for complete search history.

(56) References Cited

U.S. PATENT DOCUMENTS

| | | | | |
|---|---|---|---|---|
| 2011/0183733 | A1* | 7/2011 | Yoshida | A63F 13/12 463/1 |
| 2012/0310423 | A1* | 12/2012 | Taft | G06Q 50/06 700/286 |
| 2012/0310801 | A1 | 12/2012 | Komano et al. | |

FOREIGN PATENT DOCUMENTS

| | | |
|---|---|---|
| JP | 2004-112868 A | 4/2004 |
| WO | WO 2011/064882 A1 | 6/2011 |

*Primary Examiner* — Roy Y Yi
(74) *Attorney, Agent, or Firm* — Oblon, McClelland, Maier & Neustadt, L.L.P.

(57) ABSTRACT

According to an embodiment, a partial information generating device includes a receiver, a first generator, and a second generator. The receiver is configured to receive power usage amounts each collected for a unitary time by at least one power meter. The first generator is configured to generate a piece of first partial information from a range that is zero or more and less than a predetermined basal value for each of the power usage amounts. The second generator is configured to generate one or more pieces of auxiliary information and a piece of second partial information for the each of the power usage amounts, by using the each of the power usage amounts, the piece of first partial information, and the basal value.

7 Claims, 12 Drawing Sheets

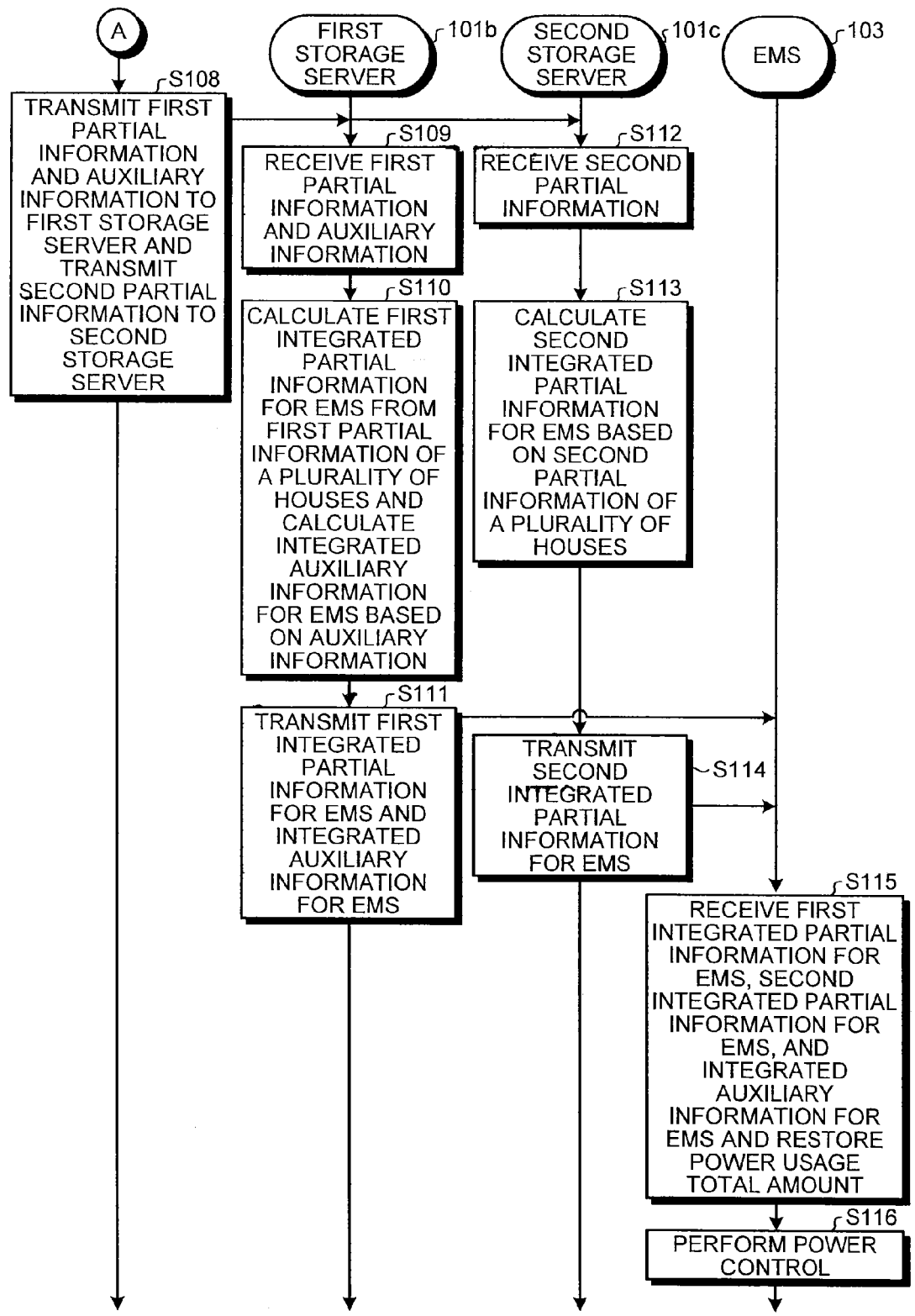

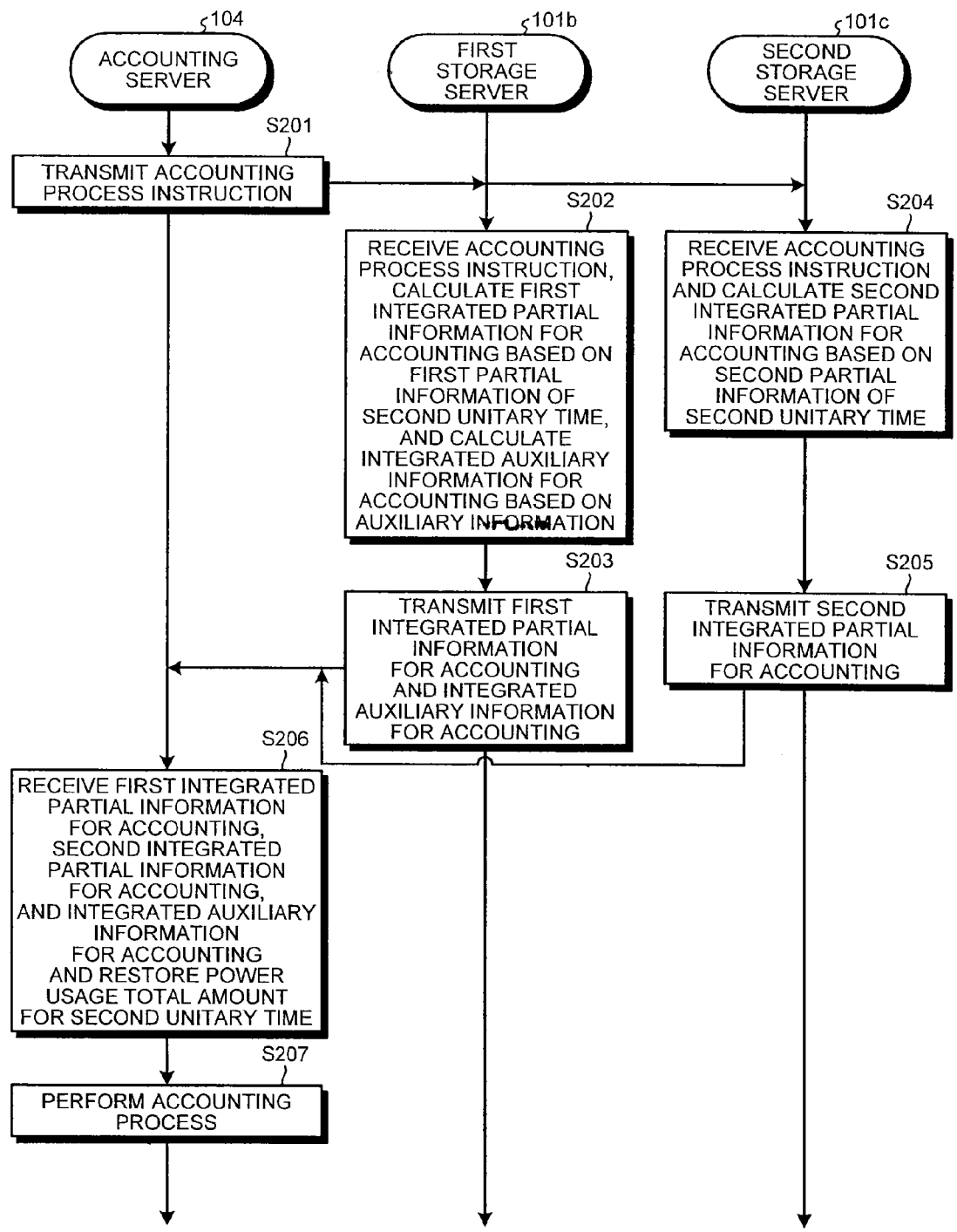

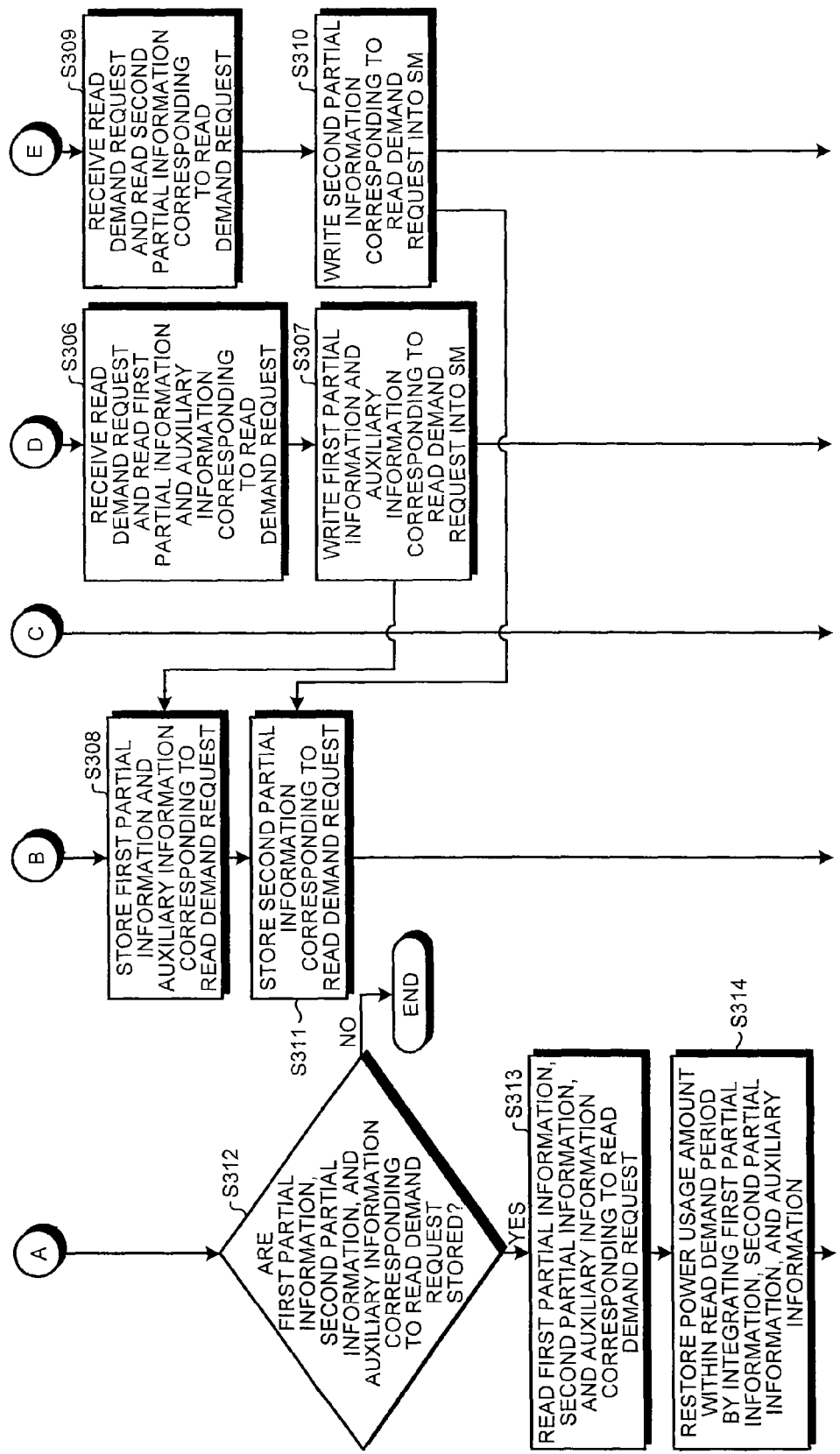

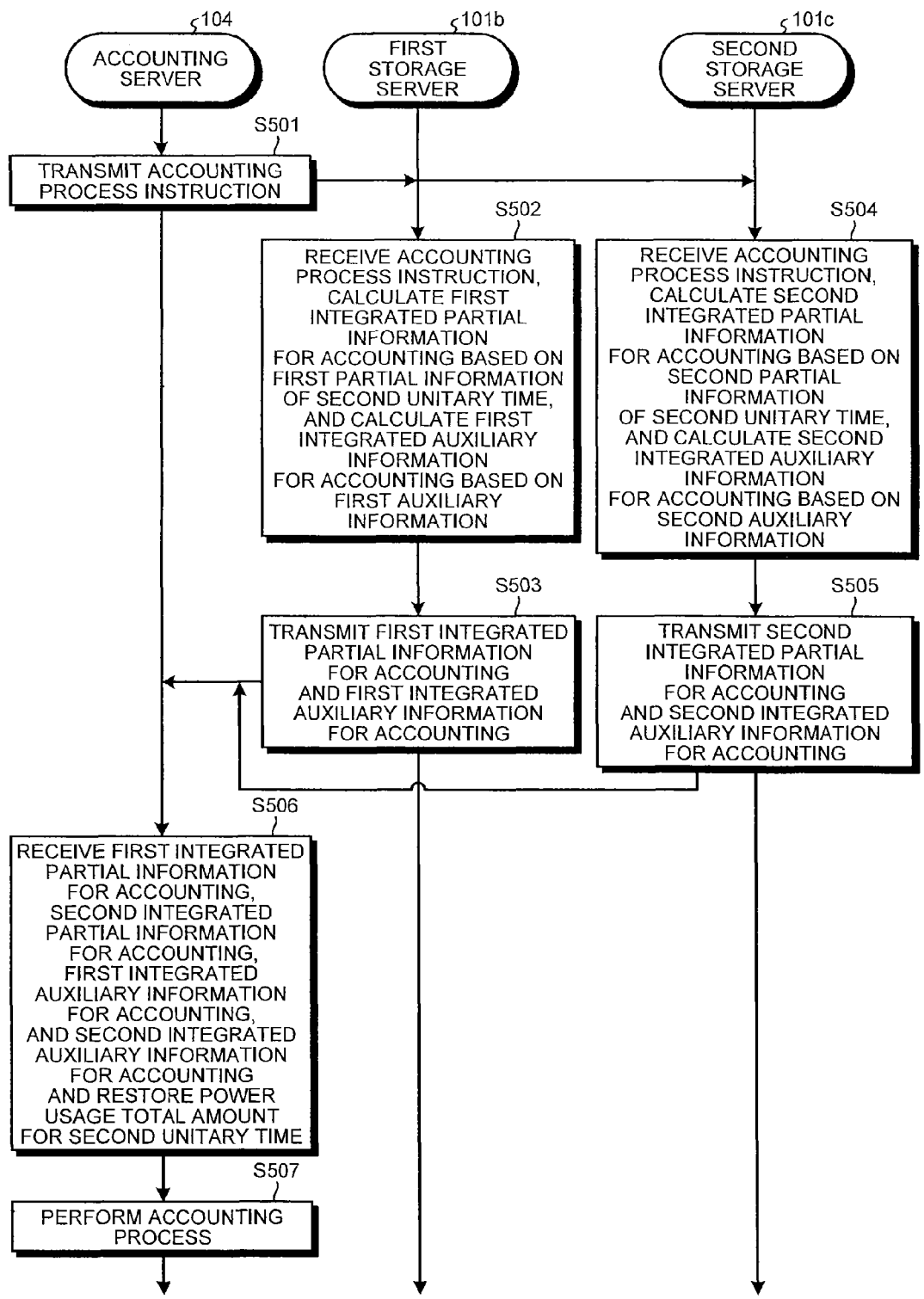

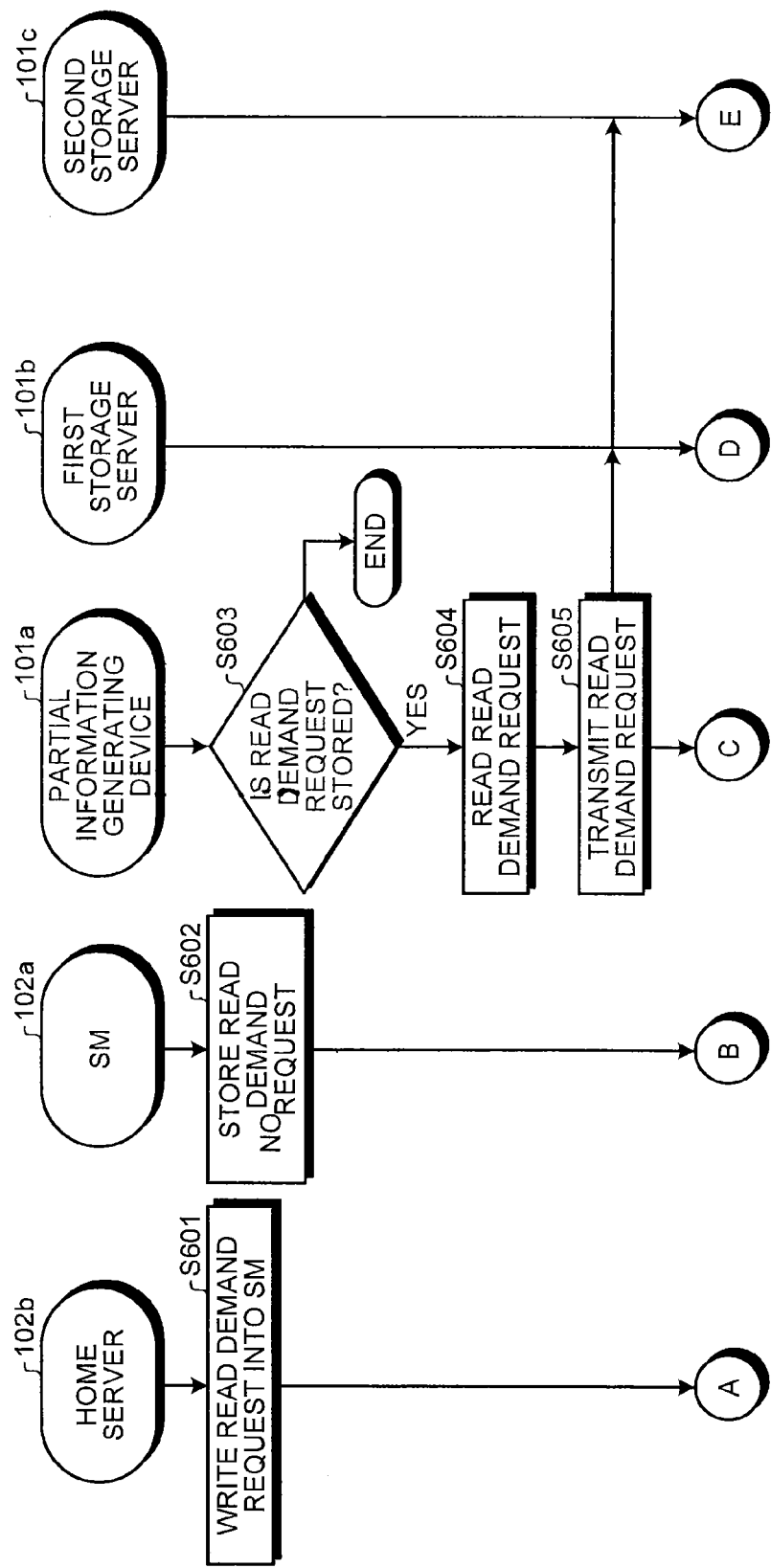

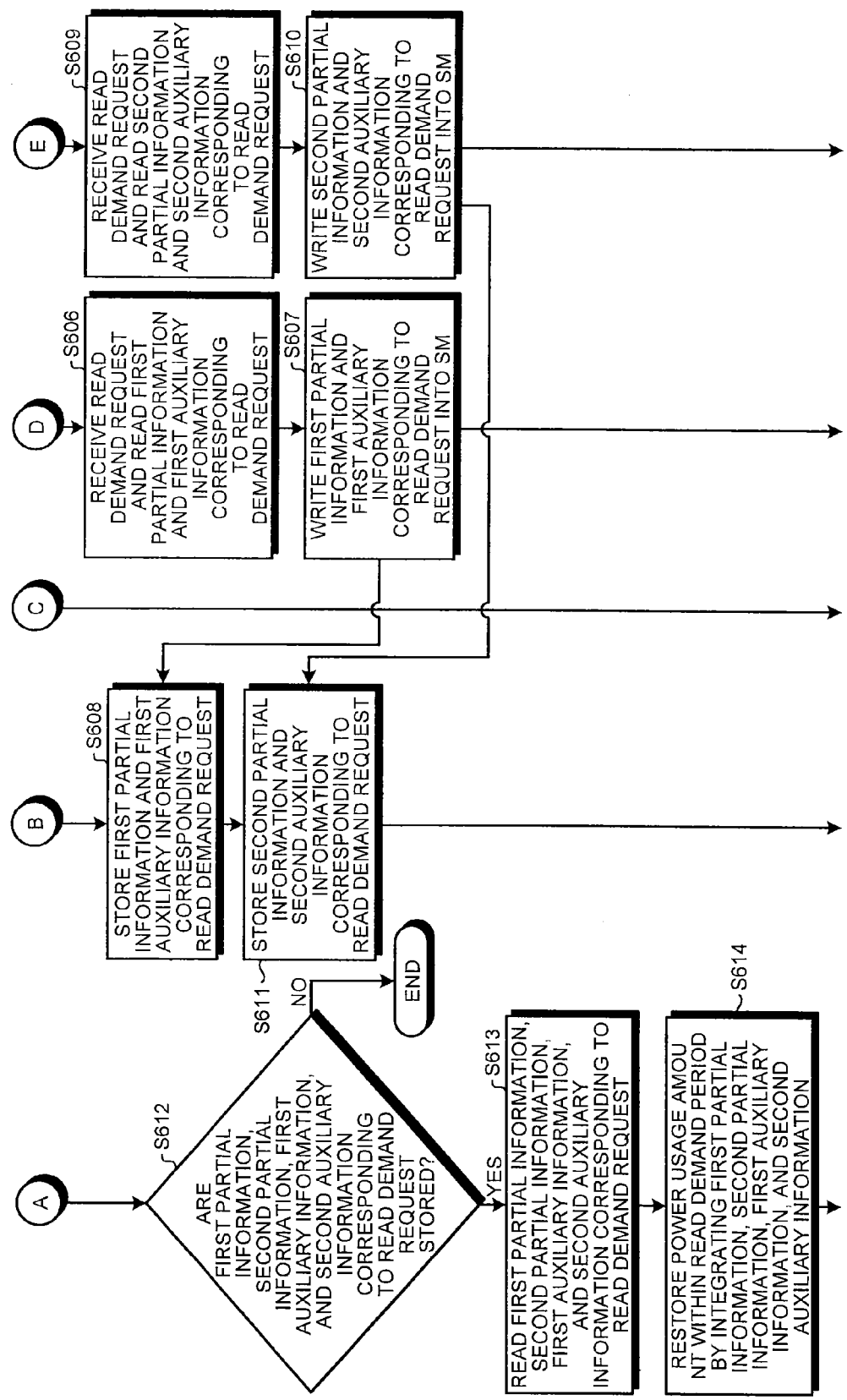

PARTIAL INFORMATION GENERATING DEVICE, POWER USAGE AMOUNT CALCULATION SYSTEM, AND PARTIAL INFORMATION GENERATING METHOD

CROSS-REFERENCE TO RELATED APPLICATION

This application is based upon and claims the benefit of priority from Japanese Patent Application No. 2013-024959, filed on Feb. 12, 2013; the entire contents of which are incorporated herein by reference.

FIELD

Embodiments described herein relate generally to a partial information generating device, a power usage amount calculation system, and a partial information generating method.

BACKGROUND

In the next-generation power grid called as a smart grid, a smart meter (hereinafter, referred to as an SM) that collects power usage amounts and a server that manages electrical devices are installed to each house or the like. The SM communicates with a meter data management system (hereinafter, referred to as an MDMS) through the power grid. The MDMS collects a power usage amount from the SM disposed in each house or the like at regular time intervals. The information of power usage amounts, which are collected by the MDMS, for example, is used by an energy management system (hereinafter, referred to as an EMS) connected to the power grid. The EMS performs power control such as requesting the SM or a sever arranged in each house within a management target area to suppress the use of power or controlling charging/discharging a storage battery connected to the power grid based on a plurality of power usage amounts collected in the MDMS. In addition, the information of the power usage amounts collected by the MDMS is also used in an accounting server connected to the power grid. The accounting server performs an accounting process for the use of power in each house based on the power usage amount of each house collected by the MDMS. Accordingly, the MDMS stores the information of the power usage amount collected from each SM in a storage server so as to be used later.

However, in a case where the information of power usage amounts stored in the storage server is seen by a supervisor of the storage server or an unauthorized user penetrating into the storage server, the situation of activities and the like in each house can be inferred, which leads to the infringement on privacy. Accordingly, a method is considered in which the privacy is protected by concealing the power usage amounts collected from the SM, and the information is stored in the storage server in a state in which a total amount of the power usage amounts can be calculated so as to be used by the EMS or the accounting server later. In such a case, the data size of the information stored in the storage server is requested to be reduced as much as possible.

BRIEF DESCRIPTION OF THE DRAWINGS

FIGS. 2A and 2B are flowcharts that illustrate the process sequence at the time of performing power control according to the first embodiment;

FIG. 3 is a flowchart that illustrates the process sequence at the time of performing an accounting process according to the first embodiment;

FIGS. 4A and 4B are flowcharts that illustrate the process sequence at the time of performing a read demand process according to the first embodiment;

FIG. 7 is a flowchart that illustrates the process sequence at the time of performing an accounting process according to the second embodiment; and FIGS. 8A and 8B are flowcharts that illustrate the process sequence at the time of performing a read demand process according to the second embodiment.

DETAILED DESCRIPTION

According to an embodiment, a partial information generating device includes a receiver, a first generator, and a second generator. The receiver is configured to receive power usage amounts each collected for a unitary time by at least one power meter. The first generator is configured to generate a piece of first partial information from a range that is zero or more and less than a predetermined basal value for each of the power usage amounts. The second generator is configured to generate one or more pieces of auxiliary information and a piece of second partial information for the each of the power usage amounts, by using the each of the power usage amounts, the piece of first partial information, and the basal value. A plurality of pieces of first partial information are used for acquiring first integrated partial information. A plurality of pieces of second partial information are used for acquiring second integrated partial information. A plurality of pieces of auxiliary information are used for acquiring integrated auxiliary information. The pieces of first partial information are stored in a first storage device. The pieces of second partial information are stored in a second storage device. The pieces of auxiliary information are stored in the first storage device, the second storage device, or a third storage device. The first integrated partial information, the second integrated partial information, the integrated auxiliary information, and the basal value are used for acquiring a total of the power usage amounts. The each of the power usage amounts is restorable by using all of the piece of first partial information, the piece of second partial information, and the piece of auxiliary information, and the basal value, but the each of the power usage amounts is unrestorable when there is a lack of at least one of the piece of first partial information, the piece of second partial information, and the piece of auxiliary information.

First Embodiment

Figure 1:
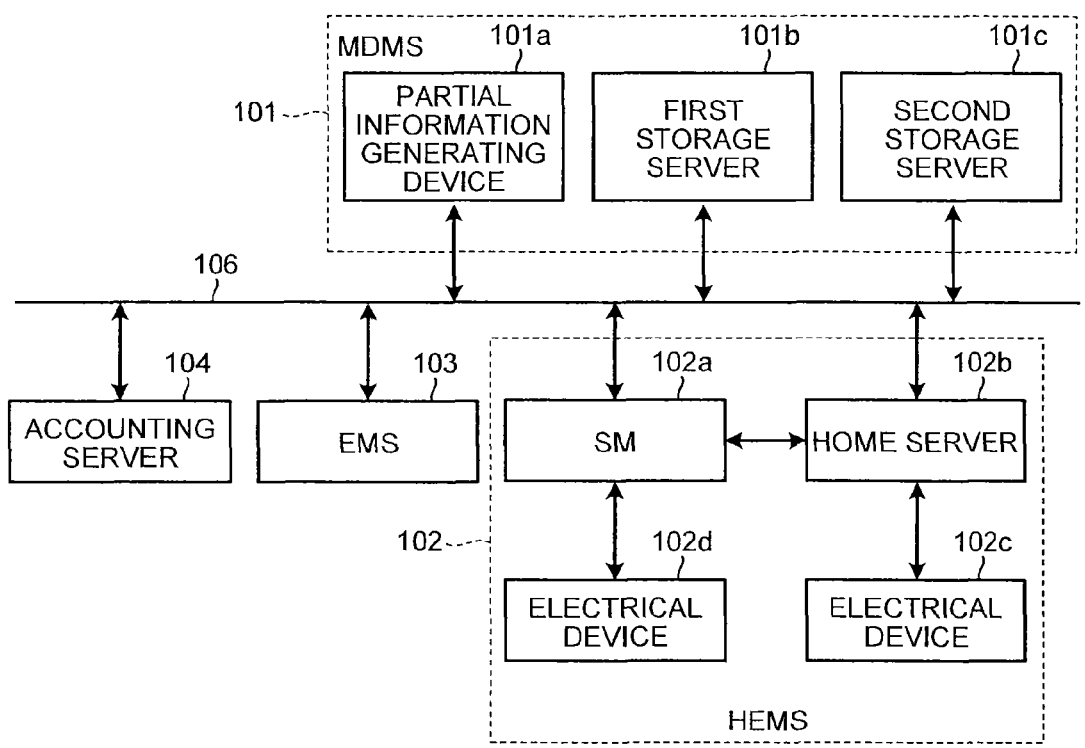
FIG. 1 is a block diagram that illustrates an example of the configuration of a power usage amount calculation system according to a first embodiment.

FIG. 1 is a block diagram that illustrates an example of the configuration of a power usage amount calculation system according to a first embodiment. The power usage amount calculation system according to this embodiment, as illustrated in FIG. 1, is equipped with an MDMS 101; an energy management system for a house (hereinafter, referred to as an HEMS (Home Energy Management System) 102, an EMS 103, and an accounting server 104 and has a configuration in which these components are interconnected through a network 106. In FIG. 1, for simplification of drawing, although only one HEMS 102 is illustrated, a plurality of HEMSs 102 are connected to the power usage amount calculation system.

The MDMS 101 is a system that collects and manages a power usage amount of each house for every unitary time through the network 106 and includes a partial information generating device 101a, a first storage server 101b, and a second storage server 101c. The partial information generating device 101a generates a plurality of pieces of partial information and auxiliary information based on information of one power usage amount (a power usage amount of the unitary time). In this embodiment, the partial information generating device 101a generates two pieces of partial information and a piece of the auxiliary information based on the information of one power usage amount. One (hereinafter, referred to as first partial information) of the two pieces of partial information is stored in the first storage server 101b, and the other (hereinafter, referred to as second partial information) of the two pieces of partial information is stored in the second storage server 101c. The auxiliary information, for example, is stored in the first storage server 101b. Here, the auxiliary information may be stored in the second storage server 101c or another storage server (third storage server) other than the first and second storage servers 101b and 101c.

The HEMS 102 is a system that is arranged in a house and manages power usage amounts of electrical devices used in the house, and includes an SM 102a, a home server 102b, and electrical devices 102c and 102d. The electrical device 102c is connected to the home server 102b in a wired or wireless manner. In addition, the electrical device 102d is connected to the SM 102a in a wired or wireless manner. The SM 102a collects a power usage amount within the HEMS 102 for every unitary time.

Unique identification information (hereinafter, referred to as house identification information) is assigned to each HEMS 102 connected to the power usage amount calculation system, and the home server 102b and the SM 102a are assumed to store the house identification information assigned to the HEMS 102. In addition, the partial information generating device 101a, the first storage server 101b, the second storage server 101c, the EMS 103, and the accounting server 104 are assumed to store all the house identification information of the HEMSs 102 connected to the power usage amount calculation system.

In this embodiment, although the collection range of power usage amounts in the SM 102a is assumed to be a house, even in a case where the collection range of power usage amounts of the SM 102a is a building such as an office building, a factory, or a region, a similar power usage amount calculation system may be built. In a case where the collection range of power usage amounts of the SM 102a is a building, the HEMS may be substituted with a BEMS (Building Energy Management System). In a case where the collection range of power usage amounts of the SM 102a is a factory, the HEMS may be substituted with a FEMS (Factory Energy Management System). In a case where the collection range of power usage amounts of the SM 102a is a region, the HEMS may be substituted with a CEMS (Community Energy Management System).

The EMS 103 acquires a total amount of power usage amounts (power usage total amount) in a management target area for the unitary time based on the power usage amounts of a plurality of houses collected by the MDMS 101 and performs power control such as requesting the SM 102a of each HEMS 102 and the home server 102b to suppress the use of power or controlling charging/discharging a storage battery connected to the power grid in consideration of the balance between the power usage total amount and the suppliable power amount.

The accounting server 104 performs an accounting process for the use of power in units of houses based on the power usage amount of each house that is collected by the MDMS 101.

The network 106, for example, is a LAN (Local Area Network), an intranet, Ethernet (registered trademark), or the Internet.

In the power usage amount calculation system having such a configuration, the partial information generating device 101a of the MDMS 101 generates a plurality of pieces of partial information (in this embodiment, two pieces of partial information) and auxiliary information by using the power usage amount for every unitary time that is collected by the SM 102a. The information collected by the MDMS 101 from the SM 102a is information in which at least house identification information and time information representing a time slot (hereinafter, referred to as a power use time) in which power is used are associated with the power usage amount. The partial information generating device 101a generates two pieces of partial information and the auxiliary information by using the information of the power usage amount with which the house identification information and the time information are associated.

A plurality of pieces of partial information and the auxiliary information can be used for restoring the original power usage amount by being integrated together. In other words, according to this embodiment, the original power usage amount can be restored by using the first partial information, the second partial information, and the auxiliary information. In addition, a total amount of a plurality of the original power usage amounts can be calculated by using information (hereinafter, referred to as first integrated partial information) acquired by integrating a plurality of pieces of first partial information generated using a plurality of power usage amounts, information (hereinafter, referred to as second integrated partial information) acquired by integrating a plurality of pieces of second partial information, and information (hereinafter, referred to as integrated auxiliary information) acquired by integrating a plurality of pieces of auxiliary information.

The two pieces of partial information generated by the partial information generating device 101a are stored in the first and second storage servers 101b and 101c in a distributed manner. In addition, the auxiliary information generated by the partial information generating device 101a, for example, is stored in the first storage server 101b. According to the purpose of the application, the first storage server 101b calculates first integrated partial information using a plurality of pieces of stored first partial information and calculates integrated auxiliary information using a plurality of pieces of stored auxiliary information. In addition, according to the purpose of the application, the second storage server 101c calculates second integrated partial information using a plurality of pieces of stored second partial information.

Here, the application, for example, is power control implemented by the EMS 103 to be described later, an accounting process implemented by the accounting server 104 to be described later, or the like. Hereinafter, integrated partial information and integrated auxiliary information calculated for performing power control using the EMS 103 will be referred to as integrated partial information for the EMS and integrated auxiliary information for the EMS, and integrated partial information and integrated auxiliary information calculated for performing an accounting process using the accounting server 104 will be referred to as integrated partial information for accounting and integrated auxiliary information for accounting. The integrated auxiliary information for the EMS is acquired by integrating partial information generated using a plurality of power usage amounts, which are collected from a plurality of the SMs 102a, of the same power use time, and the integrated auxiliary information for accounting is acquired by integrating partial information generated using a plurality of power usage amounts, which are collected from one SM 102a, of a plurality of power use times.

In a case where power control is performed by using the EMS 103, the first storage server 101b generates first integrated partial information for the EMS and the integrated auxiliary information for the EMS and transmits the generated information to the EMS 103, and the second storage server 101c generates second integrated partial information for the EMS and transmits the generated information to the EMS 103. The EMS 103 calculates a power usage total amount of the same power use time in a plurality of houses by using the first integrated partial information for the EMS and the integrated auxiliary information for the EMS that are received from the first storage server 101b and the second integrated partial information for the EMS that is received from the second storage server 101c, and performs power control in consideration of the balance between the power usage total amount and the suppliable power amount.

In a case where the accounting process is performed by the accounting server 104, the first storage server 101b generates the first integrated partial information for accounting and the integrated auxiliary information for accounting and transmits the generated information to the accounting server 104, and the second storage server 101c generates the second integrated partial information for accounting and transmits the generated information to the accounting server 104. The accounting server 104 calculates a power usage total amount of a plurality of power use times in one house by using the first integrated partial information for accounting and the integrated auxiliary information for accounting, which are received from the first storage server 101b, and the second integrated partial information for accounting received from the second storage server 101c, and performs the accounting process for the use of power in a target house based on the power usage total amount.

As a conventional technology, there is a technology in which, when the power usage amount is d, the first partial information is $d\_A$, the second partial information is $d\_B$, and the modulus (mod) is L, the first and second partial information $d\_A$ and $d\_B$ satisfying $d\_A+d\_B=d$ (mod L) are generated, and the first and second partial information $d\_A$ and $d\_B$ are stored in a plurality of storage servers in a distributed manner. However, in this conventional technology, when a total $\Sigma d\_i$ of a plurality of power usage amounts $d\_i$ to be finally restored exceeds the value of L, the total $\Sigma d\_i$ cannot be restored. Accordingly, since the value of L needs to have a sufficiently large value, the data size of the partial information stored in the storage server increases, whereby there is a problem in that the suppression of the memory resource and a decrease in the calculation efficiency occur.

In contrast to this, according to this embodiment, the first partial information $d\_A$ and the second partial information $d\_B$ satisfying one of $d\_A+d\_B=d$ or $d\_A+d\_B=d+L$ are generated by using the power usage amount d with L being used as a basal value, and auxiliary information f, which is zero in a case where $d\_A+d\_B=d$ is satisfied and is one in a case where $d\_A+d\_B=d+L$ is satisfied, is generated. Then, a total $\Sigma d\_i$ of a plurality of the power usage amounts $d\_i$ is calculated as $\Sigma d\_i=\Sigma(d\_{A\_i}+d\_{B\_i})-L\times\Sigma f\_i$. From this, the value of L may be larger than a maximal value $d\_{max}$ of one power usage amount d, and accordingly, the data size of the partial information stored in the storage server can be decreased.

Here, the hardware configurations of the partial information generating device 101a, the first storage server 101b, the second storage server 101c, the SM 102a, the home server 102b, the EMS 103, and the accounting server 104 will be described. Each one of such devices includes: a control unit such as a CPU (Central Processing Unit) that controls the overall operation of the device; a main storage unit such as a ROM (Read Only Memory) or a RAM (Random Access Memory) that stores various kinds of data or various programs; an auxiliary storage unit such as an HDD (Hard Disk Drive) or a CD (Compact Disk) drive device that stores various kinds of data or various programs; and a bus that connects those units, and has a hardware configuration using a general computer. In addition, the partial information generating device 101a, the first storage server 101b, the second storage server 101c, the home server 102b, the EMS 103, and the accounting server 104 respectively further include a communication I/F (Interface) that performs communication through the network 106. The home server 102b may further include a display unit that displays various kinds of information such as the power usage amount.

Next, in such a hardware configuration, various functions that are implemented by the CPU of each one of the partial information generating device 101a, the first storage server 101b, the second storage server 101c, the SM 102a, the home server 102b, the EMS 103, and the accounting server 104 executing various programs stored in the main storage unit or the auxiliary storage unit will be described.

The SM 102a mechanically collects power usage amounts of the electrical devices 102c and 102d for every first unitary time. Alternatively, after performing device authentication for the electrical device 102d, the SM 102a may collect the power usage amounts of the electrical devices 102c and 102d for every first unitary time by writing the power usage amount used by the electrical device 102d at least once for the first unitary time and writing the power usage amount used by the electrical device 102c managed by the home server 102b to be described later or the like. Here, the first unitary time represents a time interval at which the EMS 103 to be described later calculates a total amount (power usage total amount) of the power usage amounts and controls the power grid and, for example, is a time interval of 30 minutes. The power usage amount $z\_{i,j}$ collected by the SM 102a is read by the partial information generating device 101a. In addition, the SM 102a serves as a storage unit that writes or reads information into/from at least one of the electrical device 102d, the home server 102b, the partial information generating device 101a, the first storage server 101b, and the second storage server 101c and may have a function for spontaneously transmitting information. Hereinafter, the function for spontaneously transmitting information is assumed not to be included therein.

The home server 102b performs management of the power usage amount of the electrical device 102c serving thereunder, control of the electrical device 102c serving thereunder, and the like. In a case where the SM 102a collects the power usage amount inside the HEMS 102 based on the written power usage amount, the power usage amount of the electrical device 102c serving thereunder is measured at least once for the first unitary time, and the value thereof is written into the SM 102a. In addition, the home server 102b generates a read demand request Req_i for demanding for the reading of a power usage amount and writes the read demand request into the SM 102a, and, in response to the read demand request Req_i, the first storage server 101b reads the first partial information and the auxiliary information written into the SM 102a, and the second storage server 101c reads the second partial information written into the SM 102a, whereby a read process is performed. For the display of the power usage amount in the read process, an output terminal connected to the home server 102b may be used, or an output terminal connected to the HEMS 102 may be used.

The partial information generating device 101a is equipped with: a receiving unit that receives a power usage amount collected by the SM 102a for a plurality of first unitary times; a first generation unit that generates the first partial information from a range that is zero or more and less than a predetermined basal value for each power usage amount of the first unitary time; and a second generation unit that generates the auxiliary information and the second partial information by using the power usage amount, the first partial information, and the basal value for each power usage amount for the first unitary time.

The partial information generating device 101a reads a power usage amount $z\_\{i, j\}$ of the first unitary time from the SM 102a. Then, the partial information generating device 101a generates two pieces of partial information and the auxiliary information based on the power usage amount $z\_\{i, j\}$ by using a partial information generating algorithm D. Here, as illustrated in the following Equation (1), it is assumed that two pieces of partial information (the first partial information $x\_\{1, i, j\}$ and the second partial information $x\_\{2, i, j\}$) and a piece of the auxiliary information $f\_\{i, j\}$ are generated. Here, the subscript i represents the house identification information, and the subscript j represents the time information.

$$D(z\_\{i,j\})=(x\_\{1,i,j\},x\_\{2,i,j\},f\_\{i,j\}) \qquad (1)$$

The partial information generating device 101a transmits the first partial information $x\_\{1, i, j\}$ and the auxiliary information $f\_\{i, j\}$ generated in this way to the first storage server 101b and transmits the second partial information $x\_\{2, i, j\}$ to the second storage server 101c.

In addition, the partial information generating device 101a transmits the read demand request Req_i written into the SM 102a to the first storage server 101b and the second storage server 101c.

When the first partial information $x\_\{1, 1, j\}$, $x\_\{1, 2, j\}$, ..., $x\_\{1, n, j\}$, the auxiliary information $f\_\{1, j\}$, $f\_\{2, j\}$, $f\_\{n, j\}$, and the house identification information of each house are received for every first unitary time, the first storage server 101b stores the received information, for example, in the auxiliary storage unit in association with the power use time. Then, the first storage server 101b calculates the first integrated partial information for the EMS $s\_\{1, j\}=A\_1(x\_\{1, 1, j\}, x\_\{1, 2, j\}, \ldots, x\_\{1, n, j\})$ by integrating the first partial information $x\_\{1, 1, j\}$, $x\_\{1, 2, j\}$, $x\_\{1, n, j\}$ of all the houses using an integration algorithm A_1, calculates the integrated auxiliary information for the EMS $g\_j=B\_1(f\_\{1, j\}, f\_\{2, j\}, f\_\{n, j\})$ by integrating the auxiliary information $f\_\{1, j\}$, $f\_\{2, j\}$, $f\_\{n, j\}$ of all the houses using an integration algorithm B_1, and transmits the first integrated partial information for the EMS $s\_\{1, j\}$ and the integrated auxiliary information for the EMS $g\_j$ to the EMS 103. Here, the plurality of houses may be all the HEMS 102 connected to the power usage amount calculation system or some thereof.

In addition, in response to an accounting process instruction transmitted from the accounting server 104 to be described later, the first storage server 101b reads, out of the first partial information and the auxiliary information corresponding to the house identification information of each house, the first partial information $x\_\{1, i, 1\}$, $x\_\{1, 2\}$, ..., $x\_\{1, i, m\}$ and the auxiliary information $f\_\{i, 1\}$, $f\_\{i, 2\}$, ..., $f\_\{i, m\}$ belonging to the second unitary time from the auxiliary storage unit, calculates the first integrated partial information for accounting $u\_\{1, i\}=A\_1'(x\_\{1, i, 1\}, x\_\{1, i, 2\}, \ldots, x\_\{1, i, m\})$ by integrating all the first partial information $x\_\{1, i, 1\}$, $x\_\{1, i, 2\}$, ..., $x\_\{1, i, m\}$ belonging to the second unitary time using an integration algorithm A_1', calculates the integrated auxiliary information for accounting $h\_i=B\_1'(f\_\{i, 1\}, f\_\{i, 2\}, \ldots, f\_\{i, m\})$ by integrating all the auxiliary information $f\_\{i, 1\}$, $f\_\{i, 2\}$, ..., $f\_\{i, m\}$ belonging to the second unitary time using an integration algorithm B_1', and transmits the first integrated partial information for accounting $u\_\{1, i\}$ and the integrated auxiliary information for accounting $h\_i$ to the accounting server 104. In addition, the second unitary time represents a time unit for which the accounting process is performed, and, for example, is one month. In addition, the second unitary time is formed by m first unitary times. The partial information belonging to the second unitary time, for example, is partial information associated with a power use time that is between a start time of the second unitary time and the end time of the second unitary time as a period during which the power usage amount of a calculation source of the partial information is collected.

In addition, the first storage server 101b, in response to the read demand request Req_i transmitted from the partial information generating device 101a reads, out of the first partial information and the auxiliary information stored in association with the house identification information included in the read demand request Req_i, the first partial information $x\_\{1, i, 1\}$, $x\_\{1, i, 2\}$, ..., $x\_\{1, i, 1\}$ and the auxiliary information $f\_\{i, 1\}$, $f\_\{i, 2\}$, ..., $f\_\{i, 1\}$ corresponding to the power use time within a read demand period and writes the read information into the SM 102a.

When the second partial information $x\_\{2, 1, j\}$, $x\_\{2, 2, j\}$, ..., $x\_\{2, n, j\}$ and the house identification information of each house are received for every first unitary time, the second storage server 101c stores the received information, for example, in the auxiliary storage unit in association with the power use time. Then, the second storage server 101c calculates the second integrated partial information for the EMS $s\_\{2, j\}=A\_2(x\_\{2, 1, j\}, x\_\{2, 2, j\}, \ldots, x\_\{2, n, j\})$ by integrating the second partial information $x\_\{2, 1, j\}$, $x\_\{2, 2, j\}$, $x\_\{2, n, j\}$ of all the houses using an integration algorithm A_2 and transmits the second integrated partial information for the EMS $s\_\{2, j\}$ to the EMS 103.

In addition, in response to the accounting process instruction transmitted from the accounting server 104 to be described later, the second storage server 101c reads, out of the second partial information corresponding to the house identification information of each house, the second partial information $x\_\{2, i, 1\}$, $x\_\{2, i, 2\}$, ..., $x\_\{2, i, m\}$ belonging to the second unitary time from the auxiliary storage unit, calculates the second integrated partial information for accounting $u\_\{2, i\}, =A\_2'(x\_\{2, i, 1\}, x\_\{2, i,$ 2}, ..., x_{2, i, m}) by integrating all the second partial information x_{2, i, 1}, x_{2, i, 2}, ..., x_{2, i, m} belonging to the second unitary time by using the integration algorithm A_2, and transmits the second integrated partial information for accounting u_{2, i}, to the accounting server 104.

Furthermore, in response to the read demand request Req_i transmitted from the partial information generating device 101a, the second storage server 101c reads, out of the second partial information stored in correspondence with the house identification information included in the read demand request Req_i, the second partial information x_{2, i, 1}, x_{2, i, 2}, ..., x_{2, i, 1} corresponding to the power use time within a read demand request period and writes the read information into the SM 102a.

The EMS 103 performs power control based on a total of the power usage amounts for the first unitary time in houses included in the management target area, in other words, a power usage total amount for the first unitary time in the management target area. The power control, for example, is to transmit a control signal requesting the suppression of the use of power to the SM 102a or the home server 102b in a case where the power usage total amount exceeds an upper limit threshold and to charge the storage battery in a case where the power usage total amount is below a lower limit threshold. In order to acquire the power usage total amount, for every first unitary time, when the first integrated partial information for the EMS s_{1, j} and the integrated auxiliary information for the EMS gj transmitted from the first storage server 101b and the second integrated partial information for the EMS s_{2, j} transmitted from the second storage server 101c are received, the EMS 103 restores the power usage total amount $\Sigma\_\{i=1, \ldots, n\}z\{i, j\}=D^{-1}(s\_\{1, j\}, s\_\{2, j\}, g\_j)$ for the first unitary time in the above-described management target area by integrating the first integrated partial information for the EMS s_{1, j}, the second integrated partial information for the EMS s_{2, j}, and the integrated auxiliary information for the EMS g_j by using a restoration algorithm $D^{-1}$.

The accounting server 104 performs the accounting process for each house based on the power usage amount. More specifically, the accounting server 104 transmits an accounting process instruction for performing the accounting process to the first storage server 101b and the second storage server 101c for every second unitary time. Then, when the accounting server 104 receives the first integrated partial information for accounting u_{1}, and the integrated auxiliary information for accounting h_i, which have been transmitted from the first storage server 101b, and receives the second integrated partial information for accounting u_{2, i}, which has been transmitted from the second storage server 101c, in response to the accounting process instruction, the accounting server 104 restores the power usage total amount $\Sigma\_\{j=1, \ldots, m\}z\{i, j\}=D^{-1}(u\_\{1, i\}, u\_\{2, i\}, h\_i)$ for the second unitary time in each house by integrating the first integrated partial information for accounting u_{1, i}, the second integrated partial information for accounting u_{2, i}, and the integrated auxiliary information for accounting h_i by using the restoration algorithm $D^{-1}$. Then, the accounting server 104 performs the accounting process for each house based on the restored power usage total amount.

In the power usage amount calculation system, which has the above-described configuration, according to the first embodiment, for the communication performed through the network 106 or the communication performed in the HEMS 102, cryptographic communication such as the OpenSSL may be used so as to conceal the information that is transmitted and received.

Here, examples of the partial information generating algorithm D, the integration algorithms A_1, A_1', B_1, B A_2, and A_2', and the restoration algorithm $D^{-1}$ will be described. L is assumed to be a basal value that is an upper limit of z or more. In the partial information generating algorithm D, z that is L or less is received as an input, x_1 is randomly generated from a range that is zero or more and less than L, x_2=z−x_1 and f=0 are set in a case where z−x_1 has a positive value, x_2=z−x_1+L and f=1 are set in a case where z−x_1 has a negative value, and the partial information (x_1, x_2) and the auxiliary information f are output.

At this time, the integration algorithms A_1 and A_1' output $A\_1(x\_\{1, 1\}, x\_\{1, 2\}, \ldots, x\_\{1, k\})=A\_1'(x\_\{1, 1\}, x\_\{1, 2\}, x\_\{1, k\})=\Sigma\_\{1, \ldots, k\}x\_\{1, i\}$, and the integration algorithms B_1 and B_1' output $B\_1(f\_1, f\_2, f\_k)=B\_1'(f\_1, f\_2, \ldots, f\_k)=\Sigma\_\{i=1, \ldots, k\}f\_i$. In addition, the integration algorithms A_2 and A_2' output $A\_2(x\_\{2, 1\}, x\_\{2, 2\}, x\_\{2, k\})=A\_2'(x\_\{2, 1\}, x\_\{2, 2\}, x\_\{2, k\})=\Sigma\_\{i=1, \ldots, k\}x\_\{2, i\}$.

Furthermore, the restoration algorithm $D^{-1}$ outputs $D^{-1}(\Sigma\_\{i=1, \ldots, k\}x\_\{1, i\}, \Sigma\_\{i=1, \ldots, k\}f\_i, \Sigma\_\{i=1, \ldots, k\}x\_\{2, i\})$ $[\Sigma\_\{i=1, \ldots, k\}x\_\{1, i\}, +\Sigma\_\{i=1, \ldots, k\}x\_\{2, i\}]-L\times[\Sigma\{i=1, \ldots, k\}f\_i]$. The partial information calculated in the partial information generating algorithm D of this example divides the amount of the usage of electricity into multiple parts, and integrated partial information and integrated auxiliary information calculated in the integration algorithms A_1, A_1', B_1, B A_2, A_2' are integrated by adding the partial information and the auxiliary information.

Figure 2A:
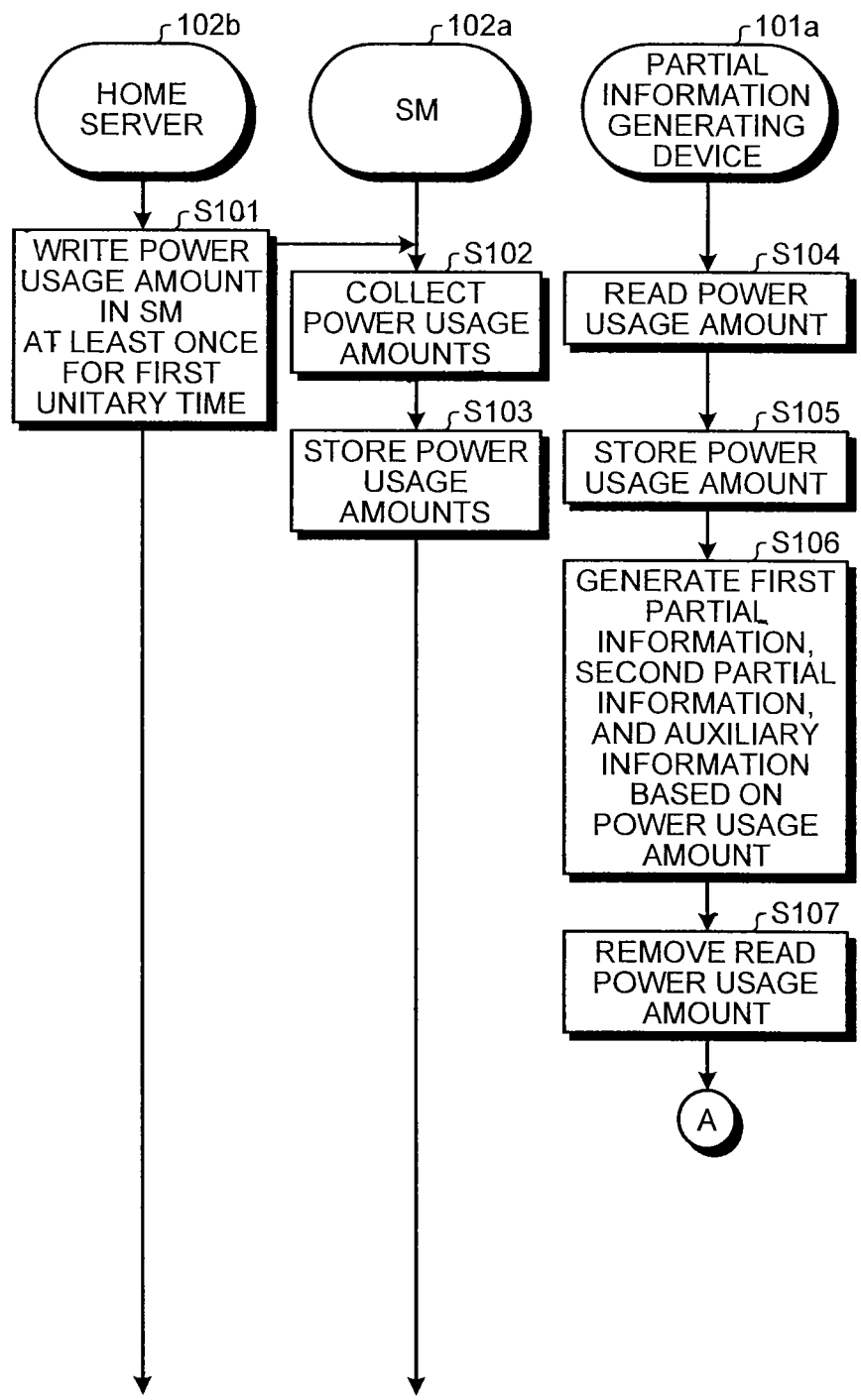

Next, the sequence of the process performed in the power usage amount calculation system according to this embodiment will be described. First, the sequence of the process at the time of performing power control using the EMS 103 will be described with reference to FIG. 2A and FIG. 2B. FIG. 2A and FIG. 2B are flowcharts that illustrate the process sequence of the power usage amount calculation system at the time of performing power control using the EMS 103.

The home server 102b writes the power usage amount of the electrical device 102c connected thereto into the SM 102a at least once for the first unitary time in step S101. The electrical device 102d, similarly, writes the power usage amount thereof into the SM 102a at least once for the first unitary time. The SM 102a collects the written power usage amounts z_{i, j} of the electrical devices 102c and 102d for every first unitary time in step S102. In a case where the SM 102a mechanically measures the power usage amounts, the process of step S101 is omitted, and the SM 102a collects the power usage amounts that have been mechanically measured in step S102. Subsequently, the SM 102a stores the collected power usage amount z_{i, j} in step S103. The power usage amount z_{i, j}, for example, is stored in the main storage unit.

The partial information generating device 101a reads the power usage amount z_{i, j} stored in the SM 102a at least once for the first unitary time in step S104. At this time, the partial information generating device 101a also reads the house identification information assigned to the HEMS 102 from the SM 102a. Then, the partial information generating device 101a stores the read power usage amount z{i, j} in step S105. This value is associated with the house identification information and, for example, is stored in the main storage unit. The partial information generating device 101a generates the first partial information $x\_\{1, i, j\}$, the second partial information $x\_\{2, i, j\}$, and the auxiliary information $f\_\{i, j\}$ of the power usage amount of the house for the first unitary time by using the partial information generating algorithm D in step S106 and removes the power usage amount $z\_\{i, j\}$ stored in step S105 from the main storage unit in step S107. The calculated values of the first partial information $x\_\{1, i, j\}$, the second partial information $x\_\{2, i, j\}$, and the auxiliary information $f\_\{i, j\}$ are associated with the house identification information and, for example, are stored in the main storage unit. The partial information generating device 101a transmits the first partial information $x\_\{1, i, j\}$ and the auxiliary information $f\_\{i, j\}$ to the first storage server 101b together with the house identification information and transmits the second partial information $x\_\{2, i, j\}$ to the second storage server 101c together with the house identification information in step S108. Thereafter, the partial information generating device 101a removes the first partial information $x\_\{1, i, j\}$, the second partial information $x\_\{2, i, j\}$, and the auxiliary information $f\_\{i, j\}$ from the main storage unit.

When the first partial information $x\_\{1, 1, j\}$, $x\_\{1, 2, j\}$, ..., $x\_\{1, n, j\}$, the auxiliary information $f\_\{1, j\}$, $f\_\{2, j\}$, ..., $f\_\{n, j\}$, and the house identification information of a plurality of houses included in the management target area of the EMS 103 are received for every first unitary time in step S109, the first storage server 101b stores the received information, for example, in the auxiliary storage unit in association with the time information (power use time). Then, the first storage server 101b calculates the first integrated partial information for the EMS $s\_\{1, j\}=A\_1(x\_\{1, 1, j\}, x\_\{1, 2, j\}, x\_\{1, n, j\})$ by integrating all the first partial information $x\_\{1, 1, j\}, x\_\{1, 2, j\}, x\_\{1, n, j\}$ using the integration algorithm $A\_1$ and calculates the integrated auxiliary information for the EMS $g\_j=B\_1(f\_\{1, j\}, f\_\{2, j\}, f\_\{n, j\})$ by integrating all the auxiliary information $f\_\{1, j\}$, $f\_\{2, j\}$, $f\_\{n, j\}$ using the integration algorithm $B\_1$ in step S110. The values of the first integrated partial information for the EMS $s\_\{1, j\}$ and the integrated auxiliary information for the EMS $g\_j$, for example, are stored in the main storage unit. Thereafter, the first storage server 101b transmits the first integrated partial information for the EMS $s\_\{1, j\}$ and the integrated auxiliary information for the EMS $g\_j$, which have been calculated in step S110 to the EMS 103 in step S111. Here, after the process of step S111 is performed, the first storage server 101b may be configured to remove the first integrated partial information for the EMS $s\_\{1, j\}$ and the integrated auxiliary information for the EMS $g\_j$ from the main storage unit.

In addition, when the second partial information $x\_\{2, 1, j\}, x\_\{2, 2, j\}, \ldots, x\_\{2, n, j\}$ and the house identification information of a plurality of houses included in the management target area of the EMS 103 are received for every first unitary time in step S112, the second storage server 101c stores the received information, for example, in the auxiliary storage unit in association with the time information (power use time). Then, the second storage server 101c calculates the second integrated partial information for the EMS $s\_\{2, j\}=A\_2(x\_\{2, 1, j\}, x\_\{2, 2, j\}, x\_\{2, n, j\})$ by integrating all the second partial information $x\_\{2, 1, j\}$, $x\_\{2, 2, j\}, \ldots, x\_\{2, n, j\}$ using the integration algorithm $A\_2$ in step S113. The value of the second integrated partial information for the EMS $s\_\{2, j\}$, for example, is stored in the main storage unit. Thereafter, the second storage server 101c transmits the second integrated partial information for the EMS $s\_\{2, j\}$ calculated in step S113 to the EMS 103 in step S114. Here, after performing the process of step S114, the second storage server 101c may be configured to remove the second integrated partial information for the EMS $s\_\{2, j\}$ from the main storage unit.

When the first integrated partial information for the EMS $s\_\{1, j\}$ and the integrated auxiliary information for the EMS $g\_j$, which have been transmitted from the first storage server 101b, and the second integrated partial information for the EMS $s\_\{2, j\}$, which has been transmitted from the second storage server 101c, are received for every first unitary time, the EMS 103 restores the power usage total amount $\Sigma\_\{i=1, \ldots, n\}z\{i, j\}=D^{-1}(s\_\{1, j\}, s\_\{2, j\}, g\_j)$ for the first unitary time in the above-described management target area by integrating the first integrated partial information for the EMS $s\_\{1, j\}$, the second integrated partial information for the EMS $s\_\{2, j\}$, and the integrated auxiliary information for the EMS $g\_j$ using the restoration algorithm $D^{-1}$ in step S115. In other words, by integrating the first integrated partial information for the EMS, the second integrated partial information for the EMS, and the integrated auxiliary information for the EMS, the EMS 103 integrates the first partial information, the second partial information, and the auxiliary information of a plurality of houses for the first unitary time so as to be summed together, and, as a result, a power usage total amount of the plurality of houses for the first unitary time can be acquired. The first integrated partial information for the EMS $s\_\{1, j\}$, the second integrated partial information for the EMS $s\_\{2, j\}$, and the integrated auxiliary information for the EMS $g\_j$, which have been received, or the restored power usage total amount $\Sigma\{i=1, \ldots, n\}z\{i, j\}$, for example, are stored in the main storage unit. Thereafter, the EMS 103 performs power control based on the power usage total amount, which has been restored in step S115, of the first unitary time in all the houses in step S116. Here, after performing the power control of step S116, the EMS 103 may be configured to remove the first integrated partial information for the EMS $s\_\{1, j\}$, the second integrated partial information for the EMS $s\_\{2, j\}$, and the integrated auxiliary information for the EMS $g\_j$, and the power usage total amount $\Sigma\_\{i=1, \ldots, n\}z\{i, j\}$, which has been restored using such information, from the main storage unit.

Next, the sequence of the process at the time of performing the accounting process using the accounting server 104 will be described with reference to FIG. 3. FIG. 3 is a flowchart that illustrates the process sequence of the power usage amount calculation system performed at the time of performing the accounting process using the accounting server 104.

When the above-described process described with reference to FIG. 2A and FIG. 2B is performed, the first storage server 101b stores the first partial information $x\_\{1, i, 1\}$, $x\_\{1, i, 2\}, \ldots, x\_\{1, i, m\}$ and the auxiliary information $f\_\{i, 1\}, f\_\{i, 2\}, f\_\{i, m\}$ of each house in association with the house identification information and the time information (power use time), and the second storage server 101c stores the second partial information $x\_\{2, i, 1\}$, $x\_\{2, i, 2\}, \ldots, x\_\{2, i, m\}$ of each house in association with the house identification information and the time information (power use time). At this time, the accounting server 104 performs the accounting process in accordance with the power usage amount of each house for every second unitary time.

First, the accounting server 104 transmits an accounting process instruction to instruct performing an accounting system process to the first and second storage servers 101b and 101c for every second unitary time in step S201. Here, the transmission of the accounting process instruction may be configured to be transmitted not from the accounting server 104 but from the first and second storage servers 101*b* and 101*c* to the accounting server 104.

When the accounting process instruction is received, the first storage server 101*b* reads, out of the first partial information and the auxiliary information corresponding to the house identification information of each house, the first partial information $x\_\{1, i, 1\}, x\_\{1, i, 2\}, \ldots, x\_\{1, i, m\}$ and the auxiliary information $f\_\{i, 1\}, f\_\{i, 2\}, \ldots, f\_\{i, m\}$ belonging to the designated second unitary time from the auxiliary storage unit, calculates the first integrated partial information for accounting $u\_\{1, i\} = A\_1'(x\_\{1, i, 1\}, x\_\{1, i, 2\}, \ldots, x\_\{1, i, m\})$ by integrating all the first partial information $x\_\{1, i, 1\}, x\_\{1, i, 2\}, \ldots, x\_\{1, m\}$ using the integration algorithm $A\_1'$, and calculates the integrated auxiliary information for accounting $h\_i = B\_1'(f\_\{i, 1\}, f\_\{i, 2\}, \ldots, f\_\{i, m\})$ by integrating all the auxiliary information $f\_\{i, 1\}, f\_\{i, 2\}, \ldots, f\_\{i, m\}$ using the integration algorithm $B\_1'$ in step S202. The values of the first integrated partial information for accounting $u\_\{1, i\}$ and the integrated auxiliary information for accounting $h\_i$, for example, are stored in the main storage unit. Thereafter, the first storage server 101*b* transmits the first integrated partial information for accounting $u\_\{1, i\}$ and the integrated auxiliary information for accounting $h\_i$, which have been calculated in step S202, to the accounting server 104 in step S203. Here, when a predetermined time elapses after the first integrated partial information for accounting $u\_\{1, i\}$ and the integrated auxiliary information for accounting $h\_i$ are calculated, the first storage server 101*b* may be configured to remove the first integrated partial information for accounting $u\_\{1, i\}$ and the integrated auxiliary information for accounting $h\_i$ from the main storage unit. Here, the predetermined time is a period during which a read demand for the power usage amount is received from the SM 102*a*, which will be described later, and, for example, is three months. In addition, after performing the process of step S202, the first storage server 101*b* may be configured to remove the first integrated partial information for accounting $u\_\{1, i\}$ and the integrated auxiliary information for accounting $h\_i$ from the main storage unit.

In addition, when receiving the accounting process instruction, the second storage server 101*c* reads, out of the second partial information corresponding to the house identification information of each house, the second partial information $x\_\{2, i, 1\}, x\_\{2, i, 2\}, \ldots, x\_\{2, i, m\}$ belonging to the designated second unitary time from the auxiliary storage unit and calculates the second integrated partial information for accounting $u\_\{2, i\}, = A\_2'(x\_\{2, 1\}, x\_\{2, i, 2\}, \ldots, x\_\{2, i, m\})$ by integrating all the second partial information $x\_\{2, i, 1\}, x\_\{2, i, 2\}, \ldots, x\_\{2, i, m\}$ using the integration algorithm $A\_2'$ in step S204. The value of the second integrated partial information for accounting $u\_\{2, i\}$, for example, is stored in the main storage unit. Thereafter, the second storage server 101*c* transmits the second integrated partial information for accounting $u\_\{2, i\}$, calculated in step S204 to the accounting server 104 in step S205. Here, when a predetermined time elapses after the second integrated partial information for accounting $u\_\{2, i\}$, is calculated, the second storage server 101*c* may be configured to remove the second integrated partial information for accounting $u\_\{2, i\}$ from the main storage unit. In addition, after performing the process of step S205, the second storage server 101*c* may be configured to remove the second integrated partial information for accounting $u\_\{2, i\}$ from the main storage unit.

When the first integrated partial information for accounting $u\_\{1, i\}$ and the integrated auxiliary information for accounting $h\_i$, which have been transmitted from the first storage server 101*b*, and the second integrated partial information for accounting $u\_\{2, i\}$, which has been transmitted from the second storage server 101*c*, are received for every second unitary time, the accounting server 104 restores the power usage total amount $\Sigma\_\{j=1, \ldots, m\} z\{i, j\} = D^{-1}(u\_\{1, i\}, u\_\{2, i\}, h\_i)$ for the second unitary time in the house that is the target of the accounting process by integrating the first integrated partial information for accounting $u\_\{1, i\}$, the second integrated partial information for accounting $u\_\{2, i\}$, and the integrated auxiliary information for accounting $hi$ using the restoration algorithm $D^{-1}$ in step S206. In other words, by integrating a plurality of pieces of second integrated partial information and the integrated auxiliary information for accounting, the accounting server 104 integrates the first partial information, the second partial information, and the auxiliary information of the second unitary time so as to be summed together for each house, and, as a result, the power usage total amount for the second unitary time in each house can be acquired. The accounting server 104 performs the accounting process for each house based on the power usage total amount of the second unitary time in each house, which has been restored in step S206, in step S207.

Figure 4A:
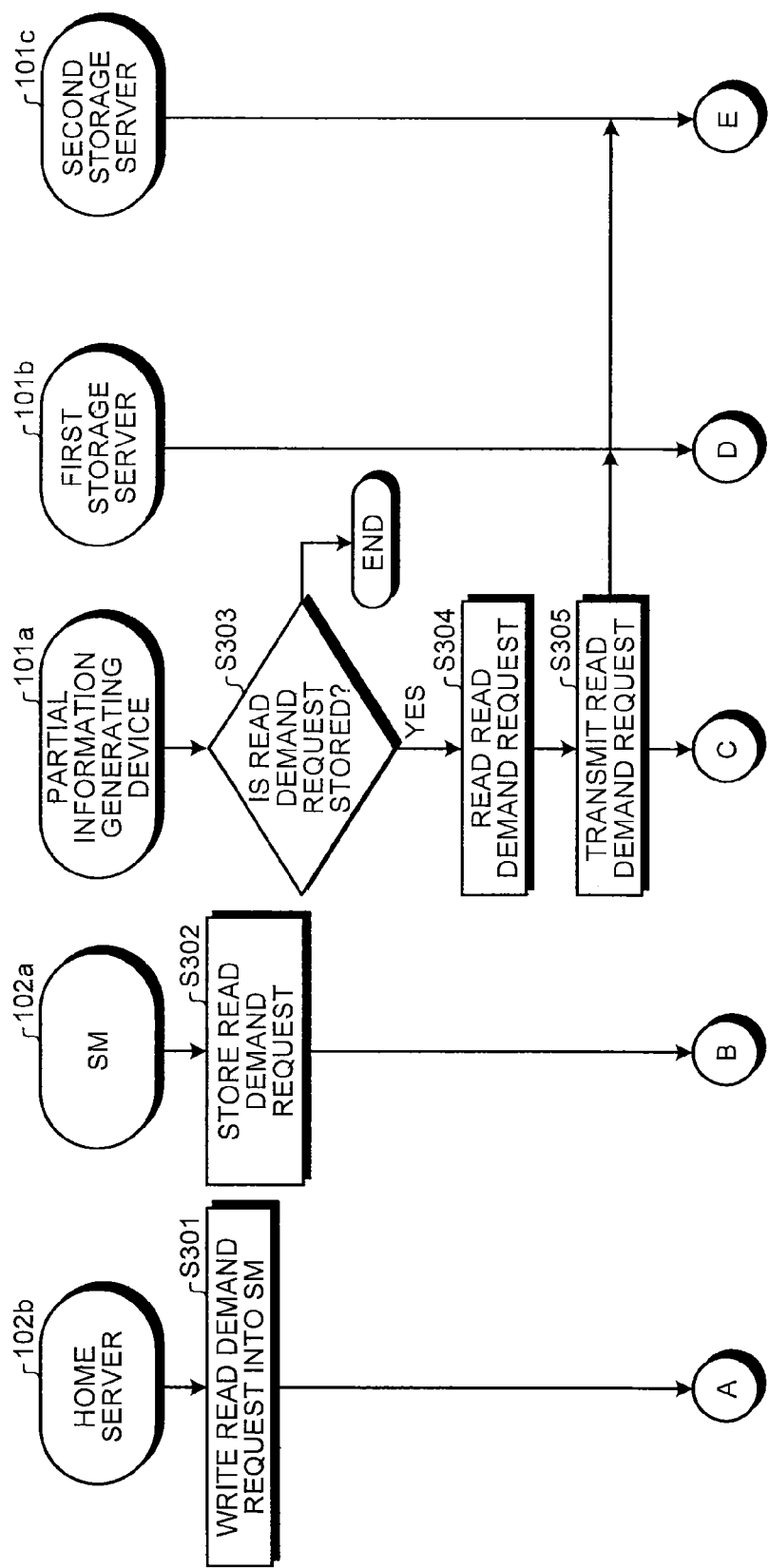

Next, the sequence of the process at the time of performing the read demand process using the home server 102*b* will be described with reference to FIG. 4A and FIG. 4B. FIG. 4A and FIG. 4B are flowcharts that illustrate the process sequence of the power usage amount calculation system at the time of performing the read demand process using the home server 102*b*.

When the above-described process described with reference to FIG. 2A and FIG. 2B is performed, the first storage server 101*b* stores the first partial information $x\_\{1, i, 1\}, x\_\{1, i, 2\}, \ldots, x\_\{1, i, m\}$ and the auxiliary information $f\_\{i, 1\}, f\_\{i, 2\}, \ldots, f\_\{i, m\}$ of each house in association with the house identification information and the time information (power use time), and the second storage server 101*c* stores the second partial information $x\_\{2, i, 1\}, x\_\{2, i, 2\}, \ldots, x\_\{2, i, m\}$ of each house in association with the house identification information and the time information (power use time). At this time, the HEMS 102 generates a read demand request for demanding the reading of the power usage amount to the MDMS 101. The read demand request Req_i includes the house identification information that is assigned to the HEMS 102 and time information that represents a period (read-desired period) during which reading of the amount of the usage of electricity is desired.

First, the home server 102*b* of the HEMS 102 writes a read demand request Req_i for demanding the reading of the power usage amount into the SM 102*a* in step S301. As a result, the read demand request Req_i is stored in the SM 102*a* in step S302. As illustrated in step S104 represented in FIG. 2A, the partial information generating device 101*a* reads a power usage amount for the first unitary time from the SM 102*a* at least once for the first unitary time and, at this time, determines whether or not the read demand request Req_i is stored in the SM 102*a* in step S303. In a case where the read demand request Req_i is determined not to be stored (No in step S303), the partial information generating device 101*a* ends the read demand process. On the other hand, in a case where the read demand request Req_i is determined to be stored (Yes in step S303), the partial information generating device 101*a* reads the read demand request Req_i from the SM 102*a* and stores the read demand request in the main storage unit in step S304. Here, after the process of step S304 is performed, the partial information generating device 101a may be configured to remove the read demand request Req_i from the SM 102a. Next, the partial information generating device 101a transmits the read demand request Req_i to the first and second storage servers 101b and 101c in step S305. Here, after performing the process of step S305, the partial information generating device 101a may be configured to remove the read demand request Req_i from the main storage unit.

When the read demand request Req_i is received, the first storage server 101b reads, out of the first partial information and the auxiliary information stored in association with the house identification information included in the read demand request Req_i, the first partial information $x\_\{1, i, 1\}, x\_\{1, i, 2\}, \ldots, f\_\{i, 1\}$ and the auxiliary information $f\_\{i, 1\}, f\_\{i, 2\}, f\_\{i, 1\}$ corresponding to the power use time within the read demand period represented by the time information included in the read demand request Req_i in step S306. The first partial information $x\_\{1, i, 1\}, x\_\{1, i, 2\}, \ldots, x\_\{1, i, 1\}$ and the auxiliary information $f\_\{i, 1, i\}, f\_\{i, 2\}, \ldots, f\_\{i, 1, i\}$, which have been read, are, for example, stored in the main storage unit. Thereafter, the first storage server 101b writes the first partial information $x\_\{1, i, 1\}, x\_\{1, i, 2\}, \ldots, x\_\{1, i, 1\}$ and the auxiliary information $f\_\{i, 1, i\}, f\_\{i, 2\}, f\_\{i, 1\}$ corresponding to the read demand request Req_i into the SM 102a in step S307. As a result, the first partial information $x\_\{1, i, 1\}, x\_\{1, i, 2\}, \ldots, x\_\{1, i, 1\}$ and the auxiliary information $f\_\{i, 1\}, f\_\{i, 2\}, \ldots, f\_\{i, 1\}$ corresponding to the read demand request Req_i are stored in the SM 102a in step S308. The first partial information $x\_\{1, i, 1\}, x\_\{1, i, 2\}, \ldots, x\_\{1, i, 1\}$ and the auxiliary information $f\_\{i, 1\}, f\_\{i, 2\}, \ldots, f\_\{i, 1\}$ may be written through the network 106 or may be written through the partial information generating device 101a and the network 106. In addition, after the process of step S307 is performed, the first storage server 101b may be configured to remove the first partial information $x\_\{1, i, 1\}, x\_\{1, i, 2\}, \ldots, x\_\{1, i, 1\}$ and the auxiliary information $f\_\{i, 1\}, f\_\{i, 2\}, \ldots, f\_\{i, 1\}$ corresponding to the read demand request Req_i from the main storage unit.

In addition, when the read demand request Req_i is received, the second storage server 101c reads, out of the second partial information stored in association with the house identification information included in the read demand request Req_i, the second partial information $x\_\{2, i, 1\}, x\_\{2, i, 2\}, \ldots, x\_\{2, i, 1\}$ corresponding to the power use time within the read demand period represented by the time information included in the read demand request Req_i in step S309. The read second partial information $x\_\{2, i, 1\}, x\_\{2, i, 2\}, \ldots, x\_\{2, i, 1\}$, for example, is stored in the main storage unit. Thereafter, the second storage server 101c writes the second partial information $x\_\{2, i, 1\}, x\_\{2, i, 2\}, \ldots, x\_\{2, i, 1\}$ corresponding to the read demand request Req_i into the SM 102a in step S310. As a result, the second partial information $x\_\{1, i, 1\}, x\_\{1, i, 2\}, \ldots, x\_\{1, i, 1\}$ corresponding to the read demand request Req_i is stored in the SM 102a in step S311. The second partial information $x\_\{2, i, 1\}, x\_\{2, i, 2\}, \ldots, x\_\{2, i, 1\}$ may be written through the network 106 or may be written through the partial information generating device 101a and the network 106. In addition, after the process of step S310 is performed, the second storage server 101c may be configured to remove the second partial information $x\_\{2, i, 1\}, x\_\{2, i, 2\}, \ldots, x\_\{2, i, 1\}$ corresponding to the read demand request Req_i from the main storage unit.

As illustrated in step S101 represented in FIG. 2A, the home server 102b writes the power usage amount of the electrical device 102c into the SM 102a at least once for the first unitary time and, at this time, determines whether or not the first partial information $x\_\{1, i, 1\}, x\_\{1, i, 2\}, \ldots, x\_\{1, i, 1\}$ and the auxiliary information $f\_\{i, 1\}, f\_\{i, 2\}, \ldots, f\_\{i, 1\}$ corresponding to the read demand request Req_i and the second partial information $x\_\{2, i, 1\}, x\_\{2, i, 2\}, \ldots, x\_\{2, i, 1\}$ corresponding to the read demand request Req_i are stored in the SM 102a in step S312. In a case where the SM 102a mechanically measures the power usage amount, and the process of step S102 represented in FIG. 2A is omitted, after the read demand request Req_i is written into the SM 102a in step S301, the home server 102b may determine whether or not the first partial information $x\_\{1, i, 1\}, x\_\{1, i, 2\}, \ldots, x\_\{1, i, 1\}$ and the auxiliary information $f\_\{i, 1\}, f\_\{i, 2\}, f\_\{i, 1\}$ corresponding to the read demand request Req_i and the second partial information $x\_\{2, i, 1\}, x\_\{2, i, 2\}, \ldots, x\_\{2, i, 1\}$ corresponding to the read demand request Req_i are stored in the SM 102a at predetermined intervals.

In a case where the first partial information $x\_\{1, 1\}, x\_\{1, i, 2\}, \ldots, x\_\{1, i, 1\}$ and the auxiliary information $f\_\{i, 1\}, f\_\{i, 2\}, \ldots, f\_\{i, 1\}$ corresponding to the read demand request Req_i and the second partial information $x\_\{2, i, 1\}, x\_\{2, i, 2\}, \ldots, x\_\{2, i, 1\}$ corresponding to the read demand request Req_i are determined not to be stored in the SM 102a (No in step S312), the home server 102b ends the read demand process. On the other hand, in a case where the first partial information $x\_\{1, i, 1\}, x\_\{1, i, 2\}, \ldots, x\_\{1, i, 1\}$ and the auxiliary information $f\_\{i, 1\}, f\_\{i, 2\}, \ldots, f\_\{1, i, 1\}$ corresponding to the read demand request Req_i and the second partial information $x\_\{2, i, 1\}, x\_\{2, i, 2\}, \ldots, x\_\{2, i, 1\}$ corresponding to the read demand request Req_i are determined to be stored in the SM 102a (Yes in step S312), the home server 102b reads the first partial information $x\_\{1, i, 1\}, x\_\{1, i, 2\}, \ldots, x\_\{1, i, 1\}$ and the auxiliary information $f\_\{i, 1, i\}, f\_\{i, 2\}, \ldots, f\_\{i, 1\}$ corresponding to the read demand request Req_i and the second partial information $x\_\{2, i, 1\}, x\_\{2, i, 2\}, \ldots, x\_\{2, i, 1\}$ corresponding to the read demand request Req_i from the SM 102a in step S313. Then, the home server 102b restores the power usage amount $z\_\{i, j\}=D^{-1}(x\_\{1, i, j\}, x\_\{2, i, j\}, f\_\{i, j\})$ of the read demand period by integrating the partial information $x\_\{1, i, j\}, x\_\{2, i, j\}$ and the auxiliary information $f\_\{i, j\}$ for $j=1, 2, \ldots, 1$ using the restoration algorithm $D^{-1}$ in step S314. The home server 102b, for example, performs a read process such as displaying the power usage amount of the read demand period on the display unit or the like and then ends the read demand process. In addition, after the process of step S314 is performed, the home server 102b may be configured to remove the first partial information $x\_\{1, i, 1\}, x\_\{1, i, 2\}, \ldots, x\_\{1, i, 1\}$ and the auxiliary information $f\_\{i, 1\}, f\_\{i, 2\}, f\_\{i, 1\}$ corresponding to the read demand request Req_i and the second partial information $x\_\{2, i, 1\}, x\_\{2, i, 2\}, \ldots, x\_\{2, i, 1\}$ corresponding to the read demand request Req_i from the SM 102a. Furthermore, in a case where the partial information generating device 101a is not configured to remove the read demand request Req_i from the SM 102a, the home server 102b may be configured to remove the read demand request Req_i from the SM 102a.

In this way, according to this embodiment, the power usage amount for the first unitary time in each house is stored in a plurality of the storage servers 101b and 101c of the MDMS 101 in a distributed manner as a plurality of pieces of partial information and the auxiliary information. Accordingly, the power usage amount of each house is not leaked even to supervisors of some storage servers and an unauthorized user penetrating into some storage servers, and therefore, the privacy of each house can be protected. In other words, a supervisor of a storage server and an unauthorized user penetrating into some storage servers cannot see the power usage amount of every first unitary time in each house and cannot infer whether a person is working at home according to the time, the situation of activities, and the like, whereby the privacy of each house can be protected.

In addition, according to this embodiment, as an application server, the EMS 103 that performs power control through the calculation of a power usage total amount for the first unitary time in all the houses included in the management target area is used, and a plurality of the storage servers 101b and 101c of the MDMS 101 calculates the first integrated partial information for the EMS, the second integrated partial information for the EMS, and the integrated auxiliary information for the EMS based on the first partial information, the second partial information, and the auxiliary information of the power usage amounts of all the houses for the first unitary time and transmits results thereof to the EMS 103. As a result, the EMS 103 can restore the power usage total amount for the first unitary time in all the houses included in the management target area but cannot calculate the power usage amount of each house for the first unitary time, whereby the privacy of each house can be protected.

Furthermore, according to this embodiment, as an application server, the accounting server 104 that performs the accounting process for each house through the calculation of the power usage total amount of each house for the second unitary time is used, and a plurality of the storage servers 101b and 101c of the MDMS 101 calculates the first integrated partial information for accounting, the second integrated partial information for accounting, and the integrated auxiliary information for accounting based on the first partial information, the second partial information, and the auxiliary information of the power usage amount of each house for a plurality of the first unitary times corresponding to the second unitary time and transmits a result thereof to the accounting server 104. As a result, the accounting server 104 can restore the power usage total amount of each house for the second unitary time but cannot calculate the power usage amount of each house for the first unitary time, whereby the privacy of each house can be protected.

In addition, according to this embodiment, the partial information generating device 101a generates the first partial information $x\_\{1, i, j\}$ and the second partial information $x\_\{2, i, j\}$ satisfying either $x\_\{1, i, j\}+x\_\{2, j\}=z\_\{i, j\}$ or $x\_\{1, i, j\}+x\_\{2, i, j\}=z\_\{i, j\}+L$ by using the power usage amount $z\_\{i, j\}$. The auxiliary information that is zero in a case where the first partial information $x\_\{1, i, j\}$ and the second partial information $x\_\{2, i, j\}$ satisfy $x\_\{1, i, j\}+x\_\{2, i, j\}=z\_\{i, j\}$ and is one in a case where the first partial information $x\_\{1, i, j\}$ and the second partial information $x\_\{2, i, j\}$ satisfy $x\_\{1, i, j\}+x\_\{2, i, j\}=z\_\{i, j\}+L$ is generated. Then, the first partial information $x\_\{1, i, j\}$, the second partial information $x\_\{2, i, j\}$, and the auxiliary information $f\_\{i, j\}$ are stored in a plurality of the storage servers 101b and 101c in a distributed manner, whereby the data size of the partial information stored in the storage servers 101b and 101c can be decreased.

Modification 1

In the above-described first embodiment, while the partial information generating device 101a has been described as being configured as an independent device, the partial information generating device 101a may be implemented as one function of the first storage server 101b or the second storage server 101c.

Figure 5:
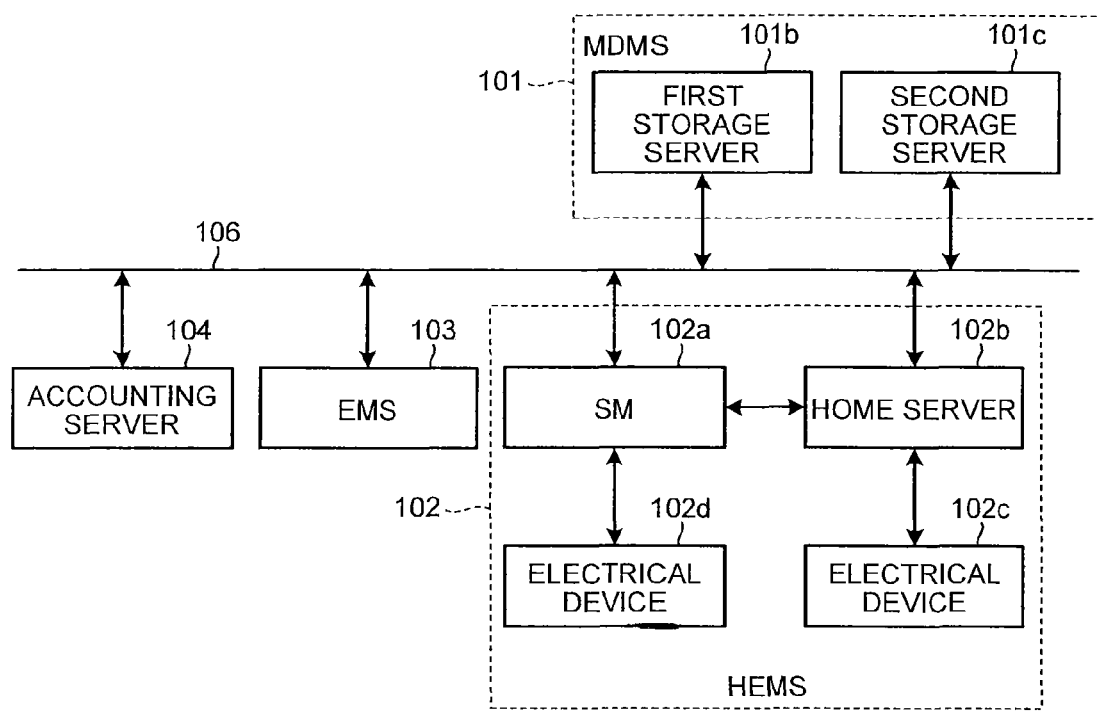
FIG. 5 is a block diagram that illustrates the configuration of a power usage amount calculation system of a modification.

FIG. 5 is a block diagram that illustrates the configuration of a power usage amount calculation system of this modification. In this modification, the process of each device is the same as that of each device according to the above-described first embodiment except that the process performed by the partial information generating device 101a is performed by a first storage server 101b, and the communication between the partial information generating device 101a and the first storage server 101b is replaced with the data process performed within the same device. Even in a case where the partial information generating device 101a is implemented as one function of the first storage server 101b, the basic system configuration and the process of each device are not changed, and thus, the description thereof will not be presented.

Modification 2

In the above-described first embodiment, while the partial information generating device 101a has been described as being configured as an independent device, the partial information generating device 101a may be implemented as one function of the SM 102a or the home server 102b. In any one of such cases, the system configuration is the same as that illustrated in FIG. 5, but the process of each device is slightly different from that of the first embodiment or Modification 1. Hereinafter, portions of the process performed in a case where the partial information generating device 101a is implemented as one function of the SM 102a, which are different from those of the above-described process according to the first embodiment, will be described. In addition, the process performed in a case where the partial information generating device 101a is implemented as one function of the SM 102a is similar thereto.

First, the process sequence at the time of performing power control using the EMS 103 in this modification will be described with reference to FIG. 2A and FIG. 2B to which the first embodiment has been described with reference. The process up to step S102 is the same as that of the above-described first embodiment. In this modification, in step S103, the SM 102a does not store the collected power usage amount $z\_\{i, j\}$ but performs the process that is performed by the partial information generating device 101a in step S106 and generates and stores the first partial information $x\_\{1, j\}$, the second partial information $x\_\{2, i, j\}$, and the auxiliary information $f\_\{i, j\}$ of the power usage amount of the house for the first unitary time.

In addition, in this modification, in step S104, the power usage amount $z\_\{i, j\}$ stored in the SM 102a is not read by the partial information generating device 101a, but the first storage server 101b reads the first partial information $x\_\{1, i, j\}$ and the auxiliary information $f\_\{i, j\}$ stored in the SM 102a together with the house identification information, and the second storage server 101c reads the second partial information $x\_\{2, i, j\}$ stored in the SM 102a together with the house identification information. Thereafter, the process of steps S105 to S108 represented in FIG. 2A and FIG. 2B is omitted, and then, similar to the first embodiment, the process of step S109 and the subsequent processes are performed.

In this modification, the process at the time of performing the accounting process using the accounting server 104 is the same as that according to the above-described first embodiment, and thus, description thereof will not be presented.

Next, the process sequence at the time of performing a read demand process using the home server 102b according to this modification will be described with reference to FIG. 4A and FIG. 4B to which the above-described first embodiment has been described with reference. The process up to step S302 is the same as that of the above-described first embodiment. In this modification, in step S303, it is not determined by the partial information generating device 101a whether or not the read demand request Req_i is stored in the SM 102a, but each of the first and second storage servers 101b and 101c determine whether or not the read demand request Req_i is stored in the SM 102a.

In addition, in this modification, in a case where the first and second storage servers 101b and 101c determine that the read demand request Req_i is stored in the SM 102a, each of the severs read the read demand request Req_i from the SM 102a. Thereafter, the process of step S305 represented in FIG. 4A is omitted, the process of step S304 according to the first embodiment is omitted, and then, similar to the first embodiment, the process of read demand request S306 and subsequent processes are performed.

Furthermore, in the first embodiment and the modification described above, while the basal value L is set to a value of the maximal value $z\_\{max\}$ or more of one power usage amount z, by generating the partial information as below, the basal value L can be set to a value smaller than the maximal value $z\_\{max\}$. In order to generate partial information corresponding to the power usage amount z, x_A is randomly generated in a range that is zero or more and less than L, and it is set such that $x\_B = z - x\_A \mod L$. Here, "a mod b" represents the modulus acquired by dividing a by b. In addition, when $z \mod L < x\_A$, the auxiliary information f is set to an integer part of $-(z/L-1)$. Alternatively, when $z \mod L \geq x\_A$, the auxiliary information f_is set to an integer part of $-z/L$. At this time, it is satisfied that $z = x\_A + x\_B - L + f$. In other words, since $\Sigma z = \Sigma x\_A + \Sigma x\_B - L \times \Sigma f$ is satisfied, desired power usage information can be restored based on the first integrated partial information for the EMS or the first integrated partial information for accounting, the second integrated partial information for the EMS or the second integrated partial information for accounting, and the integrated auxiliary information for the EMS or the integrated auxiliary information for accounting.

Second Embodiment

Next, a power usage amount calculation system according to a second embodiment will be described. According to the second embodiment, a partial information generating device 101a generates a plurality of pieces of partial information and a plurality of pieces of auxiliary information from the power usage amount, stores the plurality of pieces of partial information in a plurality of storage servers 101b and 101c in a distributed manner, and stores the plurality of pieces of auxiliary information in the plurality of storage servers 101b and 101c in a distributed manner.

The configuration of the power usage amount calculation system according to the second embodiment is the same as that of the power usage amount calculation system according to the first embodiment illustrated in FIG. 1. Hereinafter, the same reference numerals as those of the first embodiment will be assigned to devices configuring the power usage amount calculation system, and differences between a partial information generating device 101a, a home server 102b, an SM 102a, a first storage server 101b, and a second storage server 101c and those of the first embodiment will be described.

The partial information generating device 101a reads a power usage amount $z\_\{i, j\}$ of the first unitary time from the SM 102a. Then, the partial information generating device 101a generates a plurality of pieces of partial information and the auxiliary information based on the power usage amount $z\{i, j\}$ using a partial information generating algorithm D. Here, as illustrated in the following Equation (2), it is assumed that the first partial information $x\_\{1, i, j\}$, the second partial information $x\_\{2, i, j\}$, the first auxiliary information $f\_\{1, i, j\}$, and the second auxiliary information $f\_\{2, i, j\}$ are generated. Here, the subscript i represents the house identification information, and the subscript j represents the time information.

$$D(z\_\{i,j\}) = (x\_\{1,i,j\}, x\_\{2,i,j\}, f\_\{1,i,j\},$$

$$f\_\{2,i,j\}) \qquad (2)$$

The partial information generating device 101a transmits the first partial information $x\_\{1, i, j\}$ and the first auxiliary information $f\_\{1, i, j\}$ generated in this way to the first storage server 101b and transmits the second partial information $x\_\{2, i, j\}$ and the second auxiliary information $f\_\{2, i, j\}$ to the second storage server 101c.

In addition, the partial information generating device 101a transmits the read demand request Req_l written into the SM 102a to the first storage server 101b and the second storage server 101c.

When the first partial information $x\_\{1, 1, j\}, x\_\{1, 2, j\}, x\_\{1, n, j\}$, the first auxiliary information $f\_\{1, 1, j\}, f\_\{1, 2, j\}, f\_\{1, n, j\}$, and the house identification information of each house are received for every first unitary time, the first storage server 101b stores the received information, for example, in the auxiliary storage unit in association with the power use time. Then, the first storage server 101b calculates the first integrated partial information for the EMS $s\_\{1, j\} = A\_1(x\_\{1, 1, j\}, x\_\{1, 2, j\}, x\_\{1, n, j\})$ by integrating all the first partial information $x\_\{1, 1, j\}, x\_\{1, 2, j\}, x\_\{1, n, j\}$ of all the houses using an integration algorithm $A\_1$, calculates the first integrated auxiliary information for the EMS $g\_\{1, j\} = B\_2(f\_\{2, 1, j\}, f\_\{1, 2, j\}, f\_\{1, n, j\})$ by integrating all the first auxiliary information $f\_\{1, 1, j\}, f\_\{1, 2, j\}, f\_\{1, n, j\}$ of all the houses using the integration algorithm $B\_1$, and transmits the first integrated partial information for the EMS $s\_\{1, j\}$ and the first integrated auxiliary information for the EMS $g\_\{1, j\}$ to the EMS 103.

In addition, in response to an accounting process instruction transmitted from the accounting server 104, the first storage server 101b reads, out of the first partial information and the first auxiliary information corresponding to the house identification information of each house, the first partial information $x\_\{1, i, 1\}, x\_\{1, i, 2\}, \ldots, x\_\{1, m\}$ and the first auxiliary information $f\_\{1, i, 1\}, f\_\{1, i, 2\}, f\_\{1, i, m\}$ belonging to the second unitary time from the auxiliary storage unit, calculates the first integrated partial information for accounting $u\_\{1, i\} = A\_1'(x\_\{1, i, 1\}, x\_\{1, i, 2\}, \ldots, x\_\{1, i, m\})$ by integrating all the first partial information $x\_\{1, i, 1\}, x\_\{1, i, 2\}, \ldots, x\_\{1, i, m\}$ belonging to the second unitary time using an integration algorithm $A\_1'$, calculates the first integrated auxiliary information for accounting $h\{1, i\} = B\_1'(f\_\{1, i, 1\}, f\_\{1, i, 2\}, f\_\{1, i, m\})$ by integrating all the first auxiliary information $f\_\{1, i, 1\}, f\_\{1, i, 2\}, f\_\{1, i, m\}$ belonging to the second unitary time using the integration algorithm $B\_1'$, and transmits the first integrated partial information for accounting $u\_\{1, i\}$ and the first integrated auxiliary information for accounting $h\_\{1, i\}$ to the accounting server 104.

In addition, the first storage server 101b, in response to the read demand request Req_i transmitted from the partial information generating device 101a reads, out of the first partial information and the first auxiliary information stored in association with the house identification information included in the read demand request Req_i, the first partial information $x\_\{1, i, 1\}, x\_\{1, i, 2\}, \ldots, x\_\{1, 1\}$ and the first auxiliary information $f\_\{1, i, 1\}, f\_\{1, i, 2\}, f\_\{1, i, 1\}$ corresponding to the power use time within a read demand period and writes the read information into the SM 102a.

When the second partial information $x\_\{2, 1, j\}, x\_\{2, 2, j\}, x\_\{2, n, j\}$, the second auxiliary information $f\_\{2, 1, j\}$, $f\_\{2, 2, j\}, f\_\{2, n, j\}$, and the house identification information of each house are received for every first unitary time, the second storage server 101c, for example, stores the received information in the auxiliary storage unit in association with the power use time. Then, the second storage server 101c calculates the second integrated partial information for the EMS $s\_\{2, j\}=A\_2(x\_\{2, 1, j\}, x\_\{2, 2, j\}, x\_\{2, n, j\})$ by integrating the second partial information $x\_\{2, 1, j\}, x\_\{2, 2, j\}, x\_\{2, n, j\}$ of all the houses using an integration algorithm A_2, calculates the second integrated auxiliary information for the EMS $g\_\{2, j\}=B\_2(f\_\{2, 1, j\}, f\_\{2, 2, j\}, f\_\{2, n, j\})$ by integrating the second auxiliary information $f\_\{2, 1, j\}, f\_\{2, 2, j\}, f\_\{2, n, j\}$ of all the houses using the integration algorithm B_2, and transmits the second integrated partial information for the EMS $s\_\{2, j\}$ and the second integrated auxiliary information for the EMS $g\_\{2, j\}$ to the EMS 103.

In addition, in response to the accounting process instruction transmitted from the accounting server 104, the second storage server 101c reads, out of the second partial information and the second auxiliary information corresponding to the house identification information of each house, the second partial information $x\_\{2, i, 1\}, x\_\{2, i, 2\}, \ldots, x\_\{2, i, m\}$ and the second auxiliary information $f\_\{2, i, 1\}, f\_\{2, i, 2\}, f\_\{2, i, m\}$ belonging to the second unitary time from the auxiliary storage unit, calculates the second integrated partial information for accounting $u\_\{2, i\}, =A\_2'(x\_\{2, i, 1\}, x\_\{2, i, 2\}, \ldots, x\_\{2, i, m\})$ by integrating all the second partial information $x\_\{2, i, 1\}, x\_\{2, i, 2\}, \ldots, x\_\{2, i, m\}$ belonging to the second unitary time by using the integration algorithm calculates the second integrated auxiliary information for accounting $h\{2, i\}=B\_2' (f\_\{2, i, 1\}, f\_\{2, i, 2\}, f\_\{2, i, m\})$ by integrating all the second auxiliary information $f\_\{2, i, 1\}, f\_\{2, i, 2\}, f\_\{2, i, m\}$ belonging to the second unitary time by using the integration algorithm B_2', and transmits the second integrated partial information for accounting $u\_\{2, i\}$, and the second integrated auxiliary information for accounting $h\_\{2, i\}$ to the accounting server 104.

Furthermore, in response to the read demand request Req_i transmitted from the partial information generating device 101a, the second storage server 101c reads, out of the second partial information and the second auxiliary information stored in correspondence with the house identification information included in the read demand request Req_i, the second partial information $x\_\{2, i, 1\}, x\_\{2, i, 2\}, \ldots, x\_\{2, i, 1\}$ and the second auxiliary information $f\_\{2, i, 1\}, f\_\{2, i, 2\}, f\_\{2, i, 1\}$ corresponding to the power use time within a read demand request period and writes the read information into the SM 102a.

When the first integrated partial information for the EMS $s\_\{1, j\}$ and the first integrated auxiliary information for the EMS $g\_\{1, j\}$ transmitted from the first storage server 101b and the second integrated partial information for the EMS $s\_\{2, j\}$ and the second integrated auxiliary information for the EMS $g\_\{2, j\}$ transmitted from the second storage server 101c are received for every first unitary time, the EMS 103 restores the power usage total amount $\Sigma\_\{i=1, \ldots, n\}z\{i, j\}=D^{-1}(s\_\{1, j\}, g\_\{1, j\}, g\_\{2, j\})$ for the first unitary time in the above-described management target area by integrating the first integrated partial information for the EMS $s\_\{1, j\}$, the second integrated partial information for the EMS $s\_\{2, j\}$, the first integrated auxiliary information for the EMS $g\_\{1, j\}$, and the second integrated auxiliary information for the EMS $g\_\{2, j\}$ using the restoration algorithm $D^{-1}$. Then, the EMS 103 performs power control of the power grid based on the restored power usage total amount.

The accounting server 104 transmits an accounting process instruction for performing the accounting process to the first storage server 101b and the second storage server 101c for every second unitary time. Then, when the accounting server 104 receives the first integrated partial information for accounting $u\_\{1, i\}$ and the second integrated auxiliary information for accounting $h\_\{1, i\}$ which have been transmitted from the first storage server 101b, and receives the second integrated partial information for accounting $u\_\{2, i\}$ and the second integrated auxiliary information for accounting $h\_\{2, i\}$ which have been transmitted from the second storage server 101c, in response to the accounting process instruction, the accounting server 104 restores the power usage total amount $\Sigma\_\{j=1, \ldots, m\}z\{i, j\}=D^{-1}(u\_\{1, i\}, u\_\{2, i\}, h\_\{1, h\_\{2, i\} i\})$ for the second unitary time of each house by integrating the first integrated partial information for accounting $u\_\{1$, the second integrated partial information for accounting $u\_\{2, i\}, i\}$, the first integrated auxiliary information for accounting $h\_\{1, i\}$, and the second integrated auxiliary information for accounting $h\_\{2, i\}$ by using the restoration algorithm $D^{-1}$. Then, the accounting server 104 performs the accounting process for each house based on the restored power usage total amount.

In the power usage amount calculation system, which has the above-described configuration, according to the second embodiment, for the communication performed through the network 106 or the communication performed in the HEMS 102, similar to the first embodiment, cryptographic communication such as the OpenSSL may be used so as to conceal the information that is transmitted and received.

Here, examples of the partial information generating algorithm D, the integration algorithms A_1, A_1', B_1, B A_2, A_2', B_2, and B_2' and the restoration algorithm $D^{-1}$ will be described. L is assumed to be a basal value that is an upper limit of z or more. In the partial information generating algorithm D, z that is L or less is received as an input, x_1 is randomly generated from a range that is zero or more and less than L, x_2=z-x_1 and f=0 are set in a case where z-x_1 has a positive value, x_2=z-x_1+L and f=1 are set in a case where z-x_1 has a negative value. In addition, f_1 is randomly selected from {0, 1}, and a value calculated as the exclusive OR of f and f_is set to f_2. Then, the partial information generating algorithm D outputs the partial information (x_1, x_2) and the auxiliary information (f_1, f_2).

At this time, the integration algorithms A_1 and A_1' output $A\_1(x\_\{1, 1\}, x\_\{1, 2\}, \ldots, x\_\{1, k\})=A\_1'(x\_\{1, 1\}, x\_\{1, 2\}, x\_\{1, k\})=\Sigma\_\{i=1, \ldots, k\}x\_\{1, i\}$, and the integration algorithms B_1 and B_1' output $B\_1(f\_\{1, 1\}, f\_\{1, 2\}, \ldots, f\_\{1, k\})=B\_1' (f\_\{1, 1\}, f\_\{1, 2\}, f\_\{1, k\})=f\_\{1, 1\}//f\_\{1, 2\}// \ldots //f\_\{1, k\}$. Here, a // b represents connection between bit streams a and b. Similarly, the integration algorithms A_2 and A_2' output $A\_2(x\_\{2, 1\}, x\_\{2, 2\}, \ldots, x\_\{2, k\})=A\_2' (x\_\{2, 1\}, x\_\{2, 2\}, \ldots, x\_\{2, k\})=\Sigma\{i=1, \ldots, k\}x\_\{2, i\}$, and the integration algorithms B_2 and B_2' output $B\_2(f\_\{2, 1\}, f\_\{2, 2\}, \ldots, f\_\{2, k\})=B\_2'(f\_\{2, 1\}, f\_\{2, 2\}, f\_\{2, k\})=f\_\{2, 1\}//f\_\{2, 2\}// \ldots //f\_\{2, k\}$.

Furthermore, the restoration algorithm $D^{-1}$ outputs $D^{-1}$ $(\Sigma\_\{i=1, \ldots, k\}x\_\{1, i\}, f\_\{1, 1\}//f\_\{1, 2\}// \ldots //f\_\{1, k\}, \Sigma\_\{i=1, \ldots, k\}x\_\{2, i\}, f\_\{2, 1\}//f\_\{2, 2\}// \ldots //f\_\{2, k\})=[\Sigma\_\{i=1, \ldots, K\}x\_\{1, i\}+\Sigma\_\{i=1, \ldots, k\}x\_\{2, i\}]-L\times[HW(f\_\{1, 1\}//f\_\{1, 2\}// \ldots //f\_\{1, k\} (+) f\_\{2, 1\}, f\_\{2, 2\}, \ldots, f\_\{2, k\})]$. Here, a (+) b represents the exclusive OR of same-length bit streams a and b. The partial information calculated in the partial information generating algorithm D of this example is acquired by dividing the amount of the usage of electricity into multiple parts, and integrated partial information and integrated auxiliary information calculated in the integration algorithms A_1, A_1', B_1, B_1', A_2, A_2', B_2, and B_2' are integrated by adding the partial information and the auxiliary information.

Alternatively, the partial information generating algorithm D, the integration algorithms A_1, A_1', B_1, B_1', A_2, A_2', B_2, and B_2', and the restoration algorithm $D^{-1}$ may be set as below. L is assumed to be a basal value that is an upper limit of z or more. In the partial information generating algorithm D, z that is L or less is received as an input, x_1 is randomly generated from a range that is zero or more and less than L, $x\_2=z-x\_1$ and f=0 are set in a case where z−x_1 has a positive value, $x\_2=z-x\_1+L$ and f=1 are set in a case where z−x_1 has a negative value. In addition, k is randomly selected from {0, 1}, f_{k+1} is set as a value that is randomly selected from a range that is zero or more and M or less (here, M is a positive integer and is a second basal value), and f_{2-k} is set as f−f_{k+1}. Then, the partial information generating algorithm D outputs the partial information (x_1, x_2) and the auxiliary information (f_1, f_2).

At this time, the integration algorithms A_1 and A_1' output $A\_1(x\_\{1, 1\}, x\_\{1, 2\}, \ldots, x\_\{1, k\})=A\_1'(x\_\{1, 1\}, x\_\{1, 2\}, x\_\{1, k\})=\Sigma\_\{i=1, \ldots, k\}x\_\{1, i\}$, and the integration algorithms B_1 and B_1' output $B\_1(f\_\{1, 1\}, f\_\{1, 2\}, f\_\{1, k\})=B\_1'(f\_\{1, 1\}, f\_\{1, 2\}, \ldots, f\_\{1, k\})=\Sigma\_\{i=1, \ldots, k\}f\_\{1, i\}$. Similarly, the integration algorithms A_2 and A_2' output $A\_2(x\_\{2, 1\}, x\_\{2, 2\}, \ldots, x\_\{2, k\})=A\_2'(x\_\{2, 1\}, x\_\{2, 2\}, x\_\{2, k\})=\Sigma\_\{i 1, \ldots, k\}x\_\{2, i\}$, and the integration algorithms B_2 and B_2' output $B\_2(f\_\{2, 1\}, f\_\{2, 2\}, f\_\{2, k\})=B\_2'(f\_\{2, 1\}, f\_\{2, 2\}, f\_\{2, k\})=\Sigma\_\{i=1, \ldots, k\}f\_\{2, i\}$.

In addition, the restoration algorithm $D^{-1}$ outputs $D^{-1}$ $(\Sigma\_\{i=1, \ldots, k\}x\_\{1, i\}, \Sigma\_\{i=1, \ldots, k\}f\_\{1, i\}, \Sigma\_\{i=1, \ldots, k\}x\_\{2, i\}, \Sigma\_\{i=1, \ldots, k\}f\_\{2, i\})=[\Sigma\{i=1, \ldots, k\}x\_\{1, i\}+\Sigma\_\{i=1, \ldots, k\}x\_\{2, i\}]-L\times[\Sigma\_\{i=1, \ldots, k\}f\_\{1, i\}+\Sigma\_\{i=1, \ldots, k\}f\_\{2, i\}]$. The partial information calculated in the partial information generating algorithm D of this example is acquired by dividing the amount of the use of electricity into a plurality of parts, and the integrated partial information and the integrated auxiliary information calculated by the integration algorithms A_1, A_1', B_1, B_1', A_2, A_2', B_2, and B_2' are integrated by adding the partial information and the auxiliary information.

Alternatively, similar to the first embodiment, a plurality of pieces of partial information and a plurality of pieces of auxiliary information may be calculated as below. At this time, L may be set to a value smaller than the maximal value z_{max} of one power usage amount z. In other words, the partial information generating algorithm D receives z of which the upper limit is L as an input, randomly generates x_1 from the range that is zero or more and less than L, and sets $x\_2=z-x\_1 \bmod L$. In addition, when z mod L<x_1, f_is set to the integer part of −(z/L−1). On the other hand, when z mod L x_1, f_is set to the integer part of −z/L. Furthermore, k is randomly selected from {0, 1}, f_{k+1} is set to a value that is randomly selected from the range that is zero or more and M or less (here, M is a positive integer and is the second basal value), and f_{2-k} is set as f−f_{k+1}. Then, the partial information generating algorithm D outputs the partial information (x_1, x_2) and the auxiliary information (f_1, f_2).

At this time, the integration algorithms A_1 and A_1' output $A\_1(x\_\{1, 1\}, x\_\{1, 2\}, x\_\{1, k\})=A\_1'(x\_\{1, 1\}, x\_\{1, 2\}, x\_\{1, k\})=\Sigma\_\{i=1, \ldots, k\}x\_\{1, i\}$, and the integration algorithms B_1 and B_1' output $B\_1(f\_\{1, 1\}, f\_\{1, 2\}, \ldots, f\_\{1, k\})=B\_1'(f\_\{1, 1\}, f\_\{1, 2\}, f\_\{1, k\})=\Sigma\_\{i=1, \ldots, k\}f\_\{1, i\}$. Similarly, the integration algorithms A_2 and A_2' output $A\_2(x\_\{2, 1\}, x\_\{2, 2\}, \ldots x\_\{2, k\})=A\_2'(x\_\{2, 1\}, x\_\{2, 2\}, \ldots, x\_\{2, k\})=\Sigma\_\{i=1, \ldots, k\}x\_\{2, i\}$, and the integration algorithms B_2 and B_2' output $B\_2(f\_\{2, 1\}, f\_\{2, 2\}, f\_\{2, k\})=B\_2'(f\_\{2, 1\}, f\_\{2, 2\}, f\_\{2, k\})=\Sigma\_\{i=1, \ldots, k\}f\_\{2, i\}$.

In addition, the restoration algorithm $D^{-1}$ outputs $D^{-1}$ $(\Sigma\_\{i=1, \ldots, k\}x\_\{1, i\}, \Sigma\_\{i=1, \ldots, k\}f\_\{1, i\}, \Sigma\_\{i=1, \ldots, k\}x\_\{2, i\}, \Sigma\_\{i=1, \ldots, k\}f\_\{2, i\})=[\Sigma\_\{i=1, \ldots, k\}x\_\{1, i\}+\Sigma\_\{i=1, \ldots, k\}x\_\{2, i\}]-L\times[\Sigma\_\{i=1, \ldots, k\}f\_\{1, i\}+\Sigma\_\{i=1, \ldots, k\}f\_\{2, i\}]$. The partial information calculated by the partial information generating algorithm D of this example is acquired by dividing the amount of the use of electricity into multiple parts, and the integrated partial information and the integrated auxiliary information calculated by the integration algorithms A_1, A_1', B_1, B_1', A_2, A_2', B_2, and B_2' are integrated by adding the partial information and the auxiliary information.

In addition, in the above-described example, although two pieces of auxiliary information (f_1 and f_2) are generated, three or more pieces of auxiliary information may be configured to be generated. For example, four pieces of auxiliary information (f_1, f f_2, and f_2') may be generated by setting the partial information generating algorithm D, the integration algorithms A_1, A_1', B_1, B_1', A_2, A_2', B_2, and B_2', and the restoration algorithm $D^{-1}$ as below.

L is assumed to be a basal value that is the upper limit of z or less. The partial information generating algorithm D receives z that is L or less as an input, randomly selects f' from {0, 1}, randomly generates x_1 from the range that is zero or more and less than L+L' (here, a third basal value L' is an integer that is zero or larger and L or less), sets $x\_2=z-x\_1$ and f=0 in a case where $z-x\_1+f'\times L'$ has a positive value, and sets $x\_2=z-x\_1+L$ and f=1 in a case where $z-x\_1+f'\times L'$ has a negative value. In addition, f_1 is randomly selected from {0, 1}, and a value calculated as exclusive OR of f and f_1 is set as f_2. Similarly, f_1' is randomly selected from {0, 1}, and a value calculated as exclusive OR of f' and f_1' is set as f_2'. Then, the partial information generating algorithm D outputs the partial information (x_1, x_2) and the auxiliary information (f_1, f f_2, and f_2'). In the embodiment to be described later, a set (f_1, f_1') is regarded as the first auxiliary information, and a set (f_2, f_2') is regarded as the second auxiliary information.

At this time, the integration algorithms A_1 and A_1' output $A\_1(x\_\{1, 1\}, x\_\{1, 2\}, \ldots, x\_\{1, k\})=A\_1'(x\_\{1, 1\}, x\_\{1, 2\}, \ldots, x\_\{1, k\})=\Sigma\_\{i=1, \ldots, k\}x\_\{1, i\}$, and the integration algorithms B_1 and B_1' output $B\_1(f\_\{1\}, f\_\{1, 1'\}, f\_\{1, 2\}, f\_\{, 2\}', \ldots, f\_\{, k\}, f\_\{1, k\}')=B\_1'(f\_\{1, 1\}, f\_\{1, 1\}', f\_\{1, 2\}, f\_\{1, 2\}', f\_\{1, k\}, f\_\{1, k\}')=(f\_\{1, 1\}//f\_\{1, 2\}// \ldots //f\_\{1, k\}, f\_\{, 1\}'//f\_\{1, 2\}'// \ldots //f\_\{1, k\}')$. Similarly, the integration algorithms A_2 and A_2' output $A\_2(x\_\{2, 1\}, x\_\{2, 2\}, \ldots, x\_\{2, k\}) = A\_2'(x\_\{2, 1\}, x\_\{2, 2\}, x\_\{2, k\}) = \Sigma\_\{i=1, \ldots, k\} x\_\{2, i\}$, and the integration algorithms B_2 and B_2' output $B\_2(f\_\{2, 1\}, f\_\{2, 1\}', f\_\{2, 2\}, f\_\{2, 2\}', \ldots, f\_\{2, k\}') = \{2, 1\}, f\_\{2, 1\}', f\_\{2, 2\}, f\_\{2, 2\}', f\_\{2, k\}, f\_\{2, k\}') = (f\_\{2, 1\}//f\_\{2, 2\}// \ldots //f\_\{2, k\}, f\_\{2, 1\}'//f\_\{2, 2\}'// \ldots //f\_\{2, k\}')$.

In addition, the restoration algorithm $D^{-1}$ outputs $D^{-1}(\Sigma\_\{i=1, \ldots, k\} x\_\{1, i\}, f\_\{1, 1\}//f\_\{1, 2\}// \ldots //f\_\{1, k\}, f\_\{1, 1\}'//f\_\{1, 2\}'// \ldots //f\_\{1, i\}, \Sigma\_\{i=1, \ldots, k\} x\_\{2, i\}, f\_\{2, 1\}//f\_\{2, 2\}// \ldots //f\_\{2, i\}, f\_\{2, 1\}'//f\_\{2, 2\}'// \ldots //f\_\{2, k\}') = [\Sigma\_\{i=1, \ldots, k\} x\_\{1, i\} + \Sigma\_\{i=1, \ldots, k\} x\_\{2, i\}] - L' \times [HW(f\_\{1, 1\}'//f\_\{1, 2\}'// \ldots //f\_\{1, k\}' (+) f\_\{2, 1\}', f\_\{2, 2\}', f\_\{2, k\}')] - L \times [HW(f\_\{1, 1\}//f\_\{1, 2\}// \ldots //f\_\{1, i\} (+) f\_\{2, 1\}, f\_\{2, 2\}, f\_\{2, i\}]$. The partial information calculated by the partial information generating algorithm D of this example is acquired by dividing the amount of the use of electricity into multiple parts, and the integrated partial information and the integrated auxiliary information calculated by the integration algorithms A_1, A_1', B_1, B_1', A_2, A_2', 13 2, and B_2' are integrated by adding the partial information and the auxiliary information.

Figure 6A:
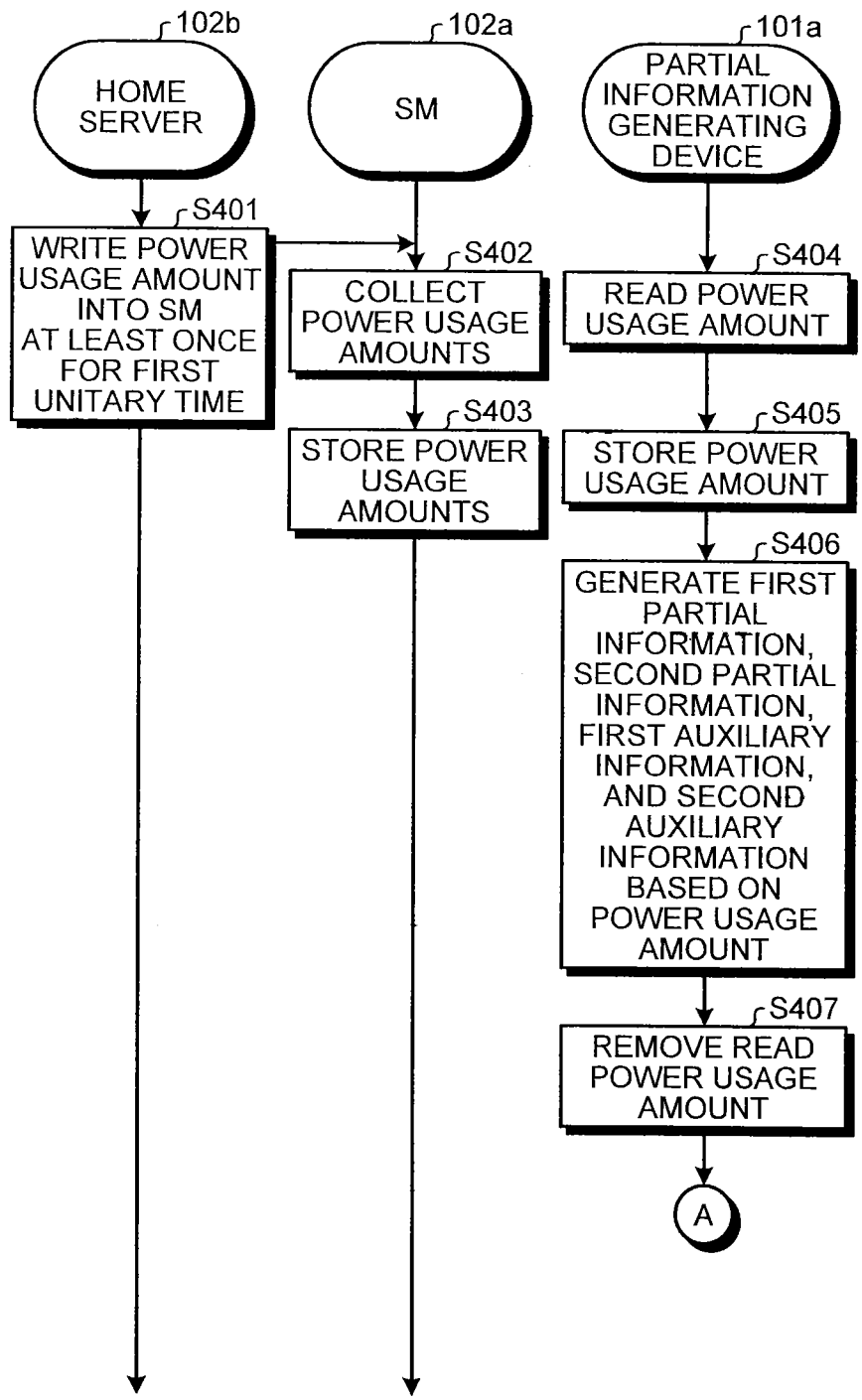
FIGS. 6A and 6B are flowcharts that illustrate the process sequence at the time of performing power control according to a second embodiment.
Figure 6B:
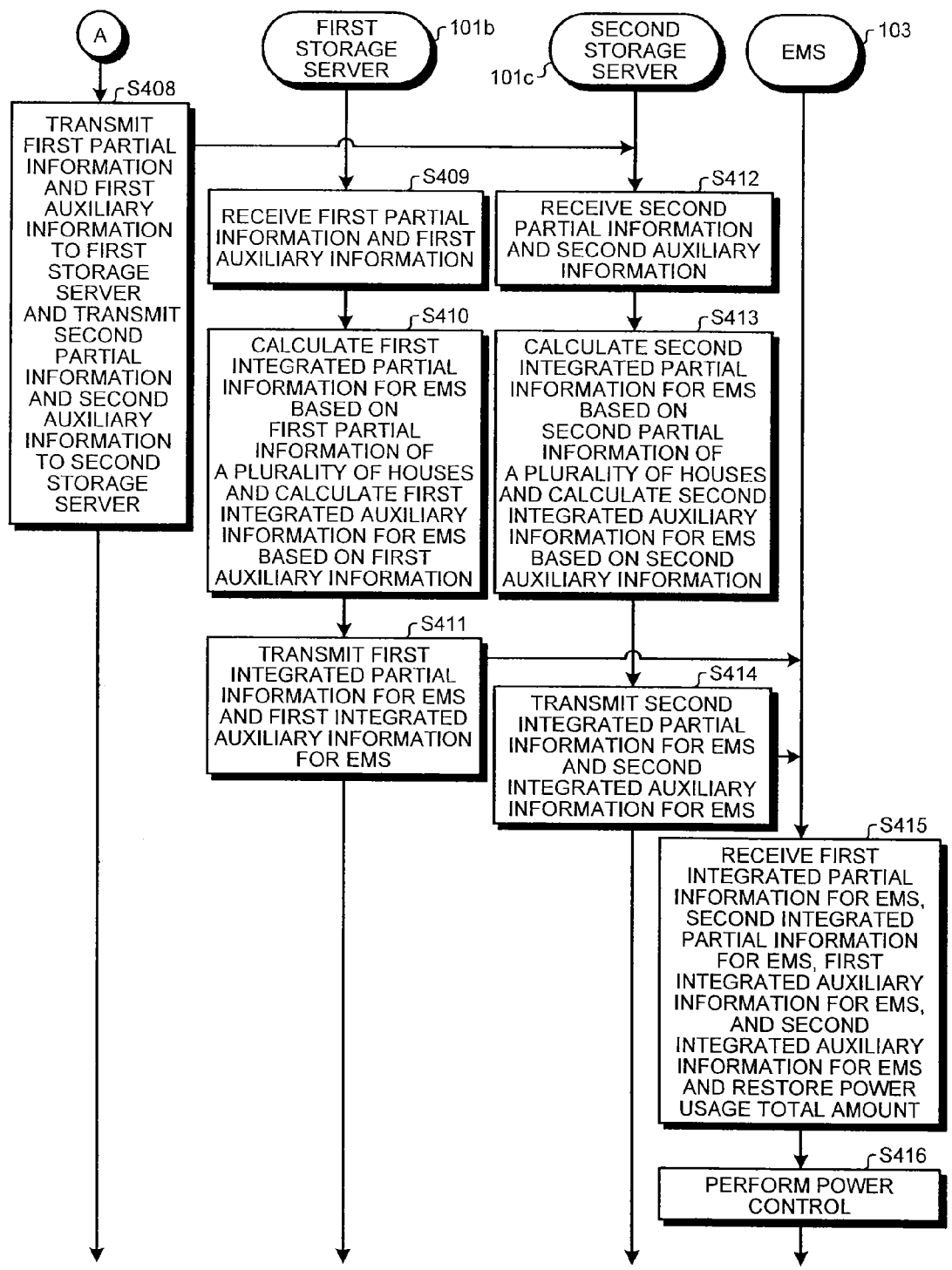

Next, the sequence of the process performed by the power usage amount calculation system according to this embodiment will be described. First, the process sequence at the time of performing power control using the EMS 103 will be described with reference to FIG. 6A and FIG. 6B. FIG. 6A and FIG. 6B are flowcharts that illustrate the process sequence of the power usage amount calculation system performed at the time of performing power control using the EMS 103.

The home server 102b writes the power usage amount of the electrical device 102c connected thereto into the SM 102a at least once for the first unitary time in step S401. The electrical device 102d, similarly, writes the power usage amount thereofinto the SM 102a at least once for the first unitary time. The SM 102a collects the written power usage amounts $z\_\{i, j\}$ of the electrical devices 102c and 102d for every first unitary time in step S402. In a case where the SM 102a mechanically measures the power usage amounts, the process of step S401 is omitted, and the SM 102a collects the power usage amounts that have been mechanically measured in step S402. Subsequently, the SM 102a stores the collected power usage amount $z\_\{i, j\}$ in step S403. The power usage amount $z\_\{i, j\}$, for example, is stored in the main storage unit.

The partial information generating device 101a reads the power usage amount $z\_\{i, j\}$ stored in the SM 102a at least once for the first unitary time in step S404. At this time, the partial information generating device 101a also reads the house identification information assigned to the HEMS 102 from the SM 102a. Then, the partial information generating device 101a stores the read power usage amount $z\_\{i, j\}$ in step S405. This value is associated with the house identification information and, for example, is stored in the main storage unit. The partial information generating device 101a generates the first partial information $x\_\{1, i, j\}$, the second partial information $x\_\{2, i, j\}$, the first auxiliary information $f\_\{1, i, j\}$, and the second auxiliary information $f\_\{2, i, j\}$ of the power usage amount of the house for the first unitary time by using the partial information generating algorithm D in step S406 and removes the power usage amount $z\_\{i, j\}$ stored in step S405 from the main storage unit in step S407. The calculated values of the first partial information $x\_\{1, i, j\}$, the second partial information $x\_\{2, i, j\}$, the first auxiliary information $f\_\{1, j\}$, and the second auxiliary information $f\_\{2, i, j\}$ are associated with the house identification information and, for example, is stored in the main storage unit. The partial information generating device 101a transmits the first partial information $x\_\{1, i, j\}$ and the first auxiliary information $f\_\{1, i, j\}$ to the first storage server 101b together with the house identification information and transmits the second partial information $x\_\{2, i, j\}$ and the second auxiliary information $f\_\{2, i, j\}$ to the second storage server 101c together with the house identification information in step S408. Thereafter, the partial information generating device 101a removes the first partial information $x\_\{1, i, j\}$, the second partial information $x\_\{2, j\}$, the first auxiliary information $f\_\{1, i, j\}$, and the second auxiliary information $f\_\{2, i, j\}$ from the main storage unit.

When the first partial information $x\_\{1, 1, j\}, x\_\{1, 2, j\}, x\_\{1, n, j\}$, the first auxiliary information $f\_\{1, 1, j\}, f\_\{1, 2, j\}, f\_\{1, n, j\}$, and the house identification information of a plurality of houses included in the management target area of the EMS 103 are received for every first unitary time in step S409, the first storage server 101b stores the received information, for example, in the auxiliary storage unit in association with the time information (power use time). Then, the first storage server 101b calculates the first integrated partial information for the EMS $s\_\{1, j\} = A\_1(x\_\{1, 1, j\}, \ldots, x\_\{1, 2, j\}, x\_\{1, n, j\})$ by integrating all the first partial information $x\_\{1, 1, j\}, x\_\{1, 2, j\}, x\_\{1, n, j\}$ using the integration algorithm A_1 and calculates the first integrated auxiliary information for the EMS $g\_\{1, j\} = B\_1(f\_\{1, 1, j\}, f\_\{1, 2, j\}, f\_\{1, n, j\})$ by integrating all the first auxiliary information $f\_\{1, 1, j\}, f\_\{1, 2, j\}, f\_\{1, n, j\}$ using the integration algorithm B_1 in step S410. The values of the first integrated partial information for the EMS $s\_\{1, j\}$ and the first integrated auxiliary information for the EMS $g\_\{1, j\}$, for example, are stored in the main storage unit. Thereafter, the first storage server 101b transmits the first integrated partial information for the EMS $s\_\{1, j\}$ and the first integrated auxiliary information for the EMS $g\_\{1, j\}$, which have been calculated in step S410 to the EMS 103 in step S411. Here, after the process of step S411 is performed, the first storage server 101b may be configured to remove the first integrated partial information for the EMS $s\_\{1, j\}$ and the first integrated auxiliary information for the EMS $g\_\{1, j\}$ from the main storage unit.

In addition, when the second partial information $x\_\{2, 1, j\}, x\_\{2, 2, j\}, x\_\{2, n, j\}$, the second auxiliary information $f\_\{2, 1, j\}, f\_\{2, 2, j\}, f\_\{2, n, j\}$, and the house identification information of a plurality of houses included in the management target area of the EMS 103 are received for every first unitary time in step S412, the second storage server 101c stores the received information, for example, in the auxiliary storage unit in association with the time information (power use time). Then, the second storage server 101c calculates the second integrated partial information for the EMS $s\_\{2, j\} = A\_2(x\_\{2, 1, j\}, x\_\{2, 2, j\}, x\_\{2, n, j\})$ by integrating all the second partial information $x\_\{2, 1, j\}, x\_\{2, 2, j\}, \ldots, x\_\{2, n, j\}$ using the integration algorithm A_2 and calculates the second integrated auxiliary information for the EMS $g\_\{2, j\} = B\_1(f\_\{2, 1, j\}, f\_\{2, 2, j\}, f\_\{2, n, j\})$ by integrating all the second auxiliary information $f\_\{2, 1, j\}, f\_\{2, 2, j\}, f\_\{2, n, j\}$ using the integration algorithm B_2 in step S413. The values of the second integrated partial information for the EMS $s\_\{2, j\}$ and the second integrated auxiliary information for the EMS $g\_\{2, j\}$, for example, are stored in the main storage unit. Thereafter, the second storage server 101c transmits the second integrated partial information for the EMS $s\_\{2, j\}$ and the second integrated auxiliary information for the EMS $g\_\{2, j\}$ calculated in step S413 to the EMS 103 in step S414. Here, after performing the process of step S414, the second storage server 101c may be configured to remove the second integrated partial information for the EMS s_{2, j} and the second integrated auxiliary information for the EMS g_{2, j} from the main storage unit.

When the first integrated partial information for the EMS s_{1, j} and the first integrated auxiliary information for the EMS g_{1, j}, which have been transmitted from the first storage server 101b, and the second integrated partial information for the EMS s_{2, j} and the second integrated auxiliary information for the EMS g_{2,j}, which have been transmitted from the second storage server 101c, are received for every first unitary time, the EMS 103 restores the power usage total amount $\Sigma\_\{i=1, \ldots, n\}z\{i, j\}=D^{-1}$ (s_{1, j}, s_{2, j}, g_{1, j}, g_{2, j}) for the first unitary time in the above-described management target area by integrating the first integrated partial information for the EMS s_{1, j}, the second integrated partial information for the EMS s_{2, j}, the first integrated auxiliary information for the EMS g_{1, j}, and the second integrated auxiliary information for the EMS g_{2, j} using the restoration algorithm $D^{-1}$ in step S415. In other words, by integrating the first integrated partial information for the EMS, the second integrated partial information for the EMS, the first integrated auxiliary information for the EMS, and the second integrated auxiliary information for the EMS, the EMS 103 integrates the first partial information, the second partial information, the first auxiliary information, and the second auxiliary information of a plurality of houses for the first unitary time so as to be summed, and, as a result, a power usage total amount of the plurality of houses for the first unitary time can be acquired. The first integrated partial information s_{1, j} and s_{2, j} and the integrated auxiliary information for the EMS g_{1, j} and g_{2, j}, which have been received, and the restored power usage total amount $\Sigma\_\{i=1, \ldots, n\}z\{i, j\}$, for example, are stored in the main storage unit. Thereafter, the EMS 103 performs power control based on the power usage total amount, which has been restored in step S415, of the first unitary time in all the houses in step S416. Here, after performing the power control of step S416, the EMS 103 may be configured to remove the first integrated partial information s_{1, j} and {2,j} and the integrated auxiliary information for the EMS g_{1, j} and g_{2, j} and the power usage total amount $\Sigma\_\{i=1, \ldots, n\}z\{i, j\}$, which has been restored using such information, from the main storage unit.

Next, the sequence of the process at the time of performing the accounting process using the accounting server 104 will be described with reference to FIG. 7. FIG. 7 is a flowchart that illustrates the process sequence of the power usage amount calculation system performed at the time of performing the accounting process using the accounting server 104 according to this embodiment.

When the above-described process described with reference to FIG. 6A and FIG. 6B is performed, the first storage server 101b stores the first partial information x_{1, i, 1}, x_{1, i, 2}, . . . , x_{1, i, m} and the first auxiliary information f_{1, i, 1}, f_{1, i, 2}, f_{1, i, m} of each house in association with the house identification information and the time information (power use time), and second storage server 101c stores the second partial information x_{2, i, 1}, x_{2, i, 2}, . . . , x_{2, i, m} and the second auxiliary information f_{2, i, 1}, f_{2, i, 2}, . . . , f_{2, i, m} of each house in association with the house identification information and the time information (power use time). At this time, the accounting server 104 performs the accounting process in accordance with the power usage amount of each house for every second unitary time.

First, the accounting server 104 transmits an accounting process instruction used for the instruction for performing an accounting system process to the first and second storage servers 101b and 101c for every second unitary time in step S501. Here, the transmission of the accounting process instruction may be configured to be transmitted not from the accounting server 104 but from the first and second storage servers 101b and 101c to the accounting server 104.

When the accounting process instruction is received, the first storage server 101b reads, out of the first partial information and the first auxiliary information corresponding to the house identification information of each house, the first partial information x_{1, i, 1}, x_{1, i, 2}, . . . , x_{1, m} and the first auxiliary information f_{1, i, 1}, f_{1, i, 2}, . . . , f_{, i, m} belonging to the designated second unitary time from the auxiliary storage unit, calculates the first integrated partial information for accounting u_{1, i}=A_1' (x_{1, i, 1}, x_{1, i, 2}, . . . , x_{1, i, m}) by integrating all the first partial information x_{1, i, 1}, x_{1, i, 2}, . . . , x_{1, i, m} using the integration algorithm A_1', and calculates the first integrated auxiliary information for accounting h_{1, i}=B_1'(f_{1, i, 1}, f_{1, i, 2}, . . . , f_{1, i, m}) by integrating all the first auxiliary information f_{1, i, 1}, f_{1, i, 2}, . . . , f_{1, i m} using the integration algorithm B_1' in step S502. The values of the first integrated partial information for accounting u_{1, i} and the first integrated auxiliary information for accounting h_{1, i}, for example, are stored in the main storage unit. Thereafter, the first storage server 101b transmits the first integrated partial information for accounting u_{1, i} and the first integrated auxiliary information for accounting h{1, i}, which have been calculated in step S502, to the accounting server 104 in step S503. Here, when a predetermined time elapses after the first integrated partial information for accounting u_{1, i} and the first integrated auxiliary information for accounting h_{1, are calculated, the first storage server 101b may be configured to remove the first integrated partial information for accounting u_1}, and the first integrated auxiliary information for accounting h_{1, i} from the main storage unit. Here, the predetermined time is a period during which a read demand for the power usage amount is received from the SM 102a, which will be described later, and, for example, is three months. In addition, after performing the process of step S502, the first storage server 101b may be configured to remove the first integrated partial information for accounting u_{1, i} and the first integrated auxiliary information for accounting h_{1, i} from the main storage unit.

In addition, when receiving the accounting process instruction, the second storage server 101c reads, out of the second partial information and the second auxiliary information corresponding to the house identification information of each house, the second partial information x_{2, i, 1}, x_{2, i, 2}, . . . , x_{2, i, m} and the second auxiliary information f_{2, i, 1}, f_{2, i, 2}, . . . , f_{2, m} belonging to the designated second unitary time from the auxiliary storage unit, calculates the second integrated partial information for accounting u_{2, i}=A_2' (x_{2, 1}, x_{2, i, 2}, . . . , x_{2, i, m}) by integrating all the second partial information x_{2, i, 1}, x_{2, i, 2}, . . . x_{2, i, m} using the integration algorithm A_2', and calculates the second integrated auxiliary information for accounting h_{2, i}=B_1' (f_{2, i, 1}, f_{2, i, 2}, . . . , f_{2, i, m}) by integrating all the second auxiliary information f_{2, i, 1}, f_{2, i, 2}, f_{2, i, m} using the integration algorithm B_2' in step S504. The values of the second integrated partial information for accounting u_{2, i} and the second integrated auxiliary information for accounting h_{2, i}, for example, are stored in the main storage unit. Thereafter, the second storage server 101c transmits the second integrated partial information for accounting u_{2, i}, and the second integrated auxiliary information for accounting h_{2, i} calculated in step S504 to the accounting server 104 in step S505. Here, when a predetermined time elapses after the second integrated partial information for accounting u_{2, i} and the second integrated auxiliary information for accounting h_{2, i} are calculated, the second storage server 101b may be configured to remove the second integrated partial information for accounting u_{2, i}, and the second integrated auxiliary information for accounting h_{2, i} from the main storage unit. In addition, after performing the process of step S505, the second storage server 101c may be configured to remove the second integrated partial information for accounting u_{2, i} and the second integrated auxiliary information for accounting h_{2, i} from the main storage unit.

When the first integrated partial information for accounting u_{1, i} and the first integrated auxiliary information for accounting h_{1, i} which have been transmitted from the first storage server 101b, and the second integrated partial information for accounting u_{2, i} and the second integrated auxiliary information for accounting h{2, i} which have been transmitted from the second storage server 101c, are received for every second unitary time, the accounting server 104 restores the power usage total amount $\{j=1, \ldots, m\}z\{i, j\}=D^{-1}(u\_\{1, i\}, u\_\{2, i\}, h\_\{1, h\_\{2, i\} i\})$ for the second unitary time in the house that is the target of the accounting process by integrating the first integrated partial information for accounting u_{1, i}, the second integrated partial information for accounting u_{2, i}, the first integrated auxiliary information for accounting h{1, i}, and the second integrated auxiliary information for accounting h_{2, i} using the restoration algorithm $D^{-1}$ in step S506. In other words, by integrating a plurality of pieces of second integrated partial information and a plurality of pieces of integrated auxiliary information for accounting, the accounting server 104 integrates the first partial information, the second partial information, the first auxiliary information, and the second auxiliary information of the second unitary time so as to be summed together for each house, and, as a result, the power usage total amount for the second unitary time in each house can be acquired. The accounting server 104 performs the accounting process for each house based on the power usage total amount of the second unitary time in each house, which has been restored in step S506, in step S07.

Next, the sequence of the process at the time of performing the read demand process using the home server 102b will be described with reference to FIG. 8A and FIG. 8B. FIG. 8A and FIG. 8B are flowcharts that illustrate the process sequence of the power usage amount calculation system at the time of performing the read demand process using the home server 102b according to this embodiment.

When the above-described process described with reference to FIG. 6A and FIG. 6B is performed, the first storage server 101b stores the first partial information x_{1, i, 1}, x_{1, i, 2}, . . . , x_{1, i, m} and the first auxiliary information f_{1, i, 1}, f_{1, i, 2}, . . . , f_{1, i, m} of each house in association with the house identification information and the time information (power use time), and the second storage server 101c stores the second partial information x_{2, i, 1}, x_{2, i, 2}, . . . , x_{2, i, m} and the second auxiliary information f_{2, i, 1}, f_{2, i, 2}, f_{2, i, m} of each house in association with the house identification information and the time information (power use time). At this time, the HEMS 102 generates a read demand request for demanding the reading of the power usage amount from the MDMS 101. The read demand request Req_i includes the house identification information that is assigned to the HEMS 102 and time information that represents a period (read-desired period) during which reading of the amount of the usage of electricity is desired.

First, the home server 102b of the HEMS 102 writes a read demand request Req_i for demanding the reading of the power usage amount into the SM 102a in step S601. As a result, the read demand request Req_i is stored in the SM 102a in step S602. As illustrated in step S404 represented in FIG. 6A, the partial information generating device 101a reads a power usage amount for the first unitary time from the SM 102a at least once for the first unitary time and, at this time, determines whether or not the read demand request Req_i is stored in the SM 102a in step S603. In a case where the read demand request Req_i is determined not to be stored (No in step S603), the partial information generating device 101a ends the read demand process. On the other hand, in a case where the read demand request Req_i is determined to be stored (Yes in step S603), the partial information generating device 101a reads the read demand request Req_i from the SM 102a and stores the read demand request in the main storage unit in step S604. Here, after the process of step S604 is performed, the partial information generating device 101a may be configured to remove the read demand request Req_i from the SM 102a. Next, the partial information generating device 101a transmits the read demand request Req_i to the first and second storage servers 101b and 101c in step S605. Here, after performing the process of step S605, the partial information generating device 101a may be configured to remove the read demand request Req_i from the main storage unit.

When the read demand request Req_i is received, the first storage server 101b reads, out of the first partial information and the first auxiliary information stored in association with the house identification information included in the read demand request Req_i, the first partial information x_{1, i, 1}, x_{1, i, 2}, . . . , x_{1, i, 1} and the first auxiliary information f_{1, i, 1}, f_{1, i, 2}, . . . , f_{1, i, 1} corresponding to the power use time within the read demand period represented by the time information included in the read demand request Req_i in step S606. The first partial information x_{1, i, 1}, x_{1, i, 2}, . . . , x_{1, i, 1} and the first auxiliary information f_{, i, 1}, f_{1, i, 2}, . . . , f_{1, i, 1}, which have been read, are, for example, stored in the main storage unit. Thereafter, the first storage server 101b writes the first partial information x_{1, i, 1}, x_{1, i, 2}, . . . , x_{1, i, 1} and the first auxiliary information f_{1, i, 1}, f_{1, i, 2}, . . . , f_{1, i, 1} corresponding to the read demand request Req_i into the SM 102a in step S607. As a result, the first partial information x_{1, i, 1}, x_{1, i, 2}, . . . , x_{1, i, 1} and the first auxiliary information f_{1, i, 1}, f_{1, i, 2}, . . . , f_{1, i, 1} corresponding to the read demand request Req_i are stored in the SM 102a in step S608. The first partial information x_{1, i, 1}, x_{1, i, 2}, . . . , x_{1, i, 1} and the first auxiliary information f_{1, i, 1}, f_{1, i, 2}, . . . , f_{1, i, 1} may be written through the network 106 or may be written through the partial information generating device 101a and the network 106. In addition, after the process of step S607 is performed, the first storage server 101b may be configured to remove the first partial information x_{1, i, 1}, x_{1, i, 2}, . . . , x_{1, i, 1} and the first auxiliary information f_{1, i, 1}, f_{1, i, 2}, ..., f_{1, i, 1} corresponding to the read demand request Req_i from the main storage unit.

In addition, when the read demand request Req_i is received, the second storage server 101c reads, out of the second partial information and the second auxiliary information stored in association with the house identification information included in the read demand request Req_i, the second partial information x_{2, i, 1}, x_{2, i, 2}, ..., x_{2, i, 1} and the second auxiliary information f_{2, i, 1}, f_{2, i, 2}, ..., f_{2, i, 1} corresponding to the power use time within the read demand period represented by the time information included in the read demand request Req_i in step S609. The read second partial information x_{2, i, 1}, x_{2, i, 2}, ..., x_{2, i, 1} and the second auxiliary information f_{2, i, 1}, f_{2, 2}, f_{2, i, 1}, for example, are stored in the main storage unit. Thereafter, the second storage server 101c writes the second partial information x_{2, i, 1}, x_{2, 2}, ..., x_{2, i, 1} and the second auxiliary information f_{2, i, 1}, f_{2, i, 2}, ..., f_{2, i, 1} corresponding to the read demand request Req_i into the SM 102a in step S610. As a result, the second partial information x_{1, i, 1}, x_{1, i, 2}, ..., x_{1, i, 1} and the second auxiliary information f_{2, i, 1}, f_{2, i, 2}, f_{2, i, 1} corresponding to the read demand request Req_i is stored in the SM 102a in step S611. The second partial information x_{2, i, 1}, x_{2, i, 2}, ..., x_{2, i, 1} and the second auxiliary information f_{2, i, 1}, f_{2, i, 2}, ..., f_{2, i, 1} may be written through the network 106 or may be written through the partial information generating device 101a and the network 106. In addition, after the process of step S610 is performed, the second storage server 101c may be configured to remove the second partial information x_{2, i, 1}, x_{2, i, 2}, ..., x_{2, i, 1} and the second auxiliary information f_{2, i, 1}, f_{2, i, 2}, f_{2, i, 1} corresponding to the read demand request Req_i from the main storage unit.

As illustrated in step S401 represented in FIG. 6A, the home server 102b writes the power usage amount of the electrical device 102c into the SM 102a at least once for the first unitary time and, at this time, determines whether or not the first partial information x_{1, i, 1}, x_{1, 2}, x_{1, i, 1} and the first auxiliary information f_{1, i, 1}, f_{1, i, 2}, f_{1, i, 1} corresponding to the read demand request Req_i and the second partial information x_{2, i, 1}, x_{2, i, 2}, ..., x_{2, i, 1} and the second auxiliary information f_{2, i, 1}, f_{2, i, 2}, f_{2, i, 1} corresponding to the read demand request Req_i are stored in the SM 102a in step S612. In a case where the SM 102a mechanically measures the power usage amount, and the process of step S402 represented in FIG. 6A is omitted, after the read demand request Req_i is written into the SM 102a in step S601, the home server 102b may determine whether or not the first partial information x_{1, i, 1}, x_{1, i, 2}, ..., x_{1, i, 1} and the first auxiliary information f_{1, i, 1}, f_{1, i, 2}, ..., f_{1, i, 1} corresponding to the read demand request Req_i and the second partial information x_{2, i, 1}, x_{2, i, 2}, ..., x_{2, i, 1} and the second auxiliary information f_{2, i, 1}, f_{2, i, 2}, f_{2, i, 1} corresponding to the read demand request Req_i are stored in the SM 102a at predetermined intervals.

In a case where the first partial information x_{1, i, 1}, x_{1, i, 2}, ..., x_{1, i, 1} and the first auxiliary information f_{1, i, 1}, f_{1, i, 2}, ..., f_{1, i, 1} corresponding to the read demand request Req_i and the second partial information x_{2, i, 1}, x_{2, i, 2}, ..., x_{2, i, 1} and the second auxiliary information f_{2, i, 1}, f_{2, i, 2}, ..., f_{2, i, 1} corresponding to the read demand request Req_i are determined not to be stored in the SM 102a (No in step S612), the home server 102b ends the read demand process. On the other hand, in a case where the first partial information x_{1, i, 1}, x_{1, i, 2}, ..., x_{1, i, 1} and the first auxiliary information f_{1, i, 1}, f_{1, i, 2}, ..., f_{1, i, 1} corresponding to the read demand request Req_i and the second partial information x_{2, i, 1}, x_{2, i, 2}, ..., x_{2, i, 1} and the second auxiliary information f_{2, i, 1}, f_{2, i, 2}, f_{2, i, 1} corresponding to the read demand request Req_i are determined to be stored in the SM 102a (Yes in step S612), the home server 102b reads the first partial information x_{1, i, 1}, x_{1, i, 2}, ..., x_{1, i, 1} and the first auxiliary information f_{1, i, 1}, f_{1, i, 2}, ..., f_{1, i, 1} corresponding to the read demand request Req_i and the second partial information x_{2, i, 1}, x_{2, i, 2}, ..., x_{2, i, 1} and the second auxiliary information f_{2, i, 1}, f_{2, i, 2}, f_{2, i, 1} corresponding to the read demand request Req_i from the SM 102a in step S613. Then, the home server 102b restores the power usage amount $z_{i, j} = D^{-1}(x_{1, i, j}, x_{2, i, j}, f_{1, i, j}, f_{2, i, j})$ of the read demand period by integrating the partial information $x_{1, i, j}$, $x_{2, i, j}$ and the auxiliary information $f_{1, i, j}$, $f_{2, i, j}$ for j=1, 2, ..., 1 using the restoration algorithm $D^{-1}$ in step S614. The home server 102b, for example, performs a read process such as displaying the power usage amount of the read demand period on the display unit or the like and then ends the read demand process. In addition, after the process of step S614 is performed, the home server 102b may be configured to remove the first partial information x_{1, 1}, x_{1, i, 2}, ..., x_{1, i, 1} and the first auxiliary information f_{, i, 1}, f_{1, i, 2}, f_{1, i, 1} corresponding to the read demand request Req_i and the second partial information x_{2, i, 1}, x_{2, i, 2}, ..., x_{2, 1} and the second auxiliary information f_{2, i, 1}, f_{2, 2}, f_{2, i, 1} corresponding to the read demand request Req_i from the SM 102a. Furthermore, in a case where the partial information generating device 101a is not configured to remove the read demand request Req_i from the SM 102a, the home server 102b may be configured to remove the read demand request Req_i from the SM 102a.

In this way, according to this embodiment, the power usage amount for the first unitary time in each house is stored in a plurality of the storage servers 101b and 101c of the MDMS 101 in a distributed manner as a plurality of pieces of partial information and the auxiliary information. Accordingly, the power usage amount of each house is not leaked even to supervisors of some storage servers and an unauthorized user penetrating into some storage servers, and therefore, the privacy of each house can be protected. In other words, a supervisor of a storage server and an unauthorized user penetrating into some storage servers do not see the power usage amount of every first unitary time in each house and cannot infer whether a person is working at home according to the time, the situation of activities, and the like, whereby the privacy of each house can be protected.

In addition, according to this embodiment, as an application server, the EMS 103 that performs power control through the calculation of a power usage total amount for the first unitary time in all the houses included in the management target area is used, and a plurality of the storage servers 101b and 101c of the MDMS 101 calculates a plurality of pieces of integrated partial information for the EMS and a plurality of pieces of integrated auxiliary information for the EMS based on the partial information and the auxiliary information of the power usage amounts of all the houses for the first unitary time and transmits results thereof to the EMS 103. As a result, the EMS 103 can restore the power usage total amount for the first unitary time in all the houses included in the management target area but cannot calculate the power usage amount of each house for the first unitary time, whereby the privacy of each house can be protected.

Furthermore, according to this embodiment, as an application server, the accounting server 104 that performs the accounting process for each house through the calculation of the power usage total amount of each house for the second unitary time is used, and a plurality of the storage servers 101b and 101c of the MDMS 101 calculates a plurality of pieces of integrated partial information for accounting and a plurality of pieces of integrated auxiliary information for accounting based on the partial information and the auxiliary information of the power usage amount of each house for a plurality of the first unitary times corresponding to the second unitary time and transmits a result thereof to the accounting server 104. As a result, the accounting server 104 can restore the power usage total amount of each house for the second unitary time but cannot calculate the power usage amount of each house for the first unitary time, whereby the privacy of each house can be protected.

In addition, according to this embodiment, the partial information generating device 101a generates the first partial information $x\_\{1, i, j\}$ and the second partial information $x\_\{2, i, j\}$ satisfying either $x\_\{1, i, j\}+x\_\{2, i, j\}=z\_\{i, j\}$ or $x\_\{1, i, j\}+x\_\{2, i, j\}=z\_\{i, j\}+L$ by using the power usage amount $z\_\{i, j\}$. The auxiliary information that is zero in a case where the first partial information $x\_\{1, i, j\}$ and the second partial information $x\_\{2, i, j\}$ satisfy $x\_\{1, i, j\}+x\_\{2, i, j\}=z\{i, j\}$ and is one in a case where the first partial information $x\_\{1, i, j\}$ and the second partial information $x\_\{2, i, j\}$ satisfy $x\_\{1, i, j\}+x\_\{2, i, j\}=z\{i, j\}+L$ is generated. In addition, the auxiliary information $f\_\{i, j\}$ is converted into the first auxiliary information $f\_\{1, i, j\}$ and the second auxiliary information $f\_\{2, i, j\}$, and the first partial information $x\_\{1, i, j\}$, the second partial information $x\_\{2, i, j\}$, the first auxiliary information $f\_\{1, j\}$, and the second auxiliary information $f\_\{2, i, j\}$ are stored in a plurality of the storage servers 101b and 101c in a distributed manner, whereby the data size of the partial information stored in the storage servers 101b and 101c can be decreased, and the concealment of the information can be improved.

Modification

Also in this embodiment, similar to the above-described first embodiment, the partial information generating device 101a may be implemented as one function of any one of the first storage server 101b, the second storage server 101c, the SM 102a, and the home server 102b.

In each embodiment described above, the functions of the partial information generating device 101a, the first storage server 101b, the second storage server 101c, the SM 102a, the home server 102b, the EMS 103 and the accounting server 104 may be implemented by executing programs in a hardware environment using a general computer. In such a case, various programs each executed by at least one of the partial information generating device 101a, the first storage server 101b, the second storage server 101c, the SM 102a, the home server 102b, the EMS 103 and the accounting server 104 may be configured to be stored on a computer connected to a network such as the Internet and be downloaded through the network. In addition, the various programs may be recorded on a computer-readable recording medium such as a CD-ROM, a flexible disk (FD), a CD-R, or a DVD (Digital Versatile Disc) in an installable format or an executable format and be provided as a computer program product.

For example, in each embodiment described above, the MDMS 101 is configured to be equipped with two storage servers (the first storage server 101b and the second storage server 101c), three or more storage servers may be equipped therein. In such a case, the partial information generating device 101a or the home server 102b may be configured to generate three or more pieces of partial information based on the power usage amount for the first unitary time, which has been collected by the SM 102a, and store the partial information in three or more storage servers in a distributed manner. Alternatively, the partial information generated based on the power usage amount for the first unitary time may be configured to be stored in not all the plurality of storage servers but some of the storage servers in a distributed manner. In addition, the partial information generating device 101a of the MDMS 101 and the plurality of storage servers do not need to be present at the same place, but may be interconnected through the network 106, or may be managed by another company.

In addition, in each embodiment described above, although the EMS 103 and the accounting server 104 are used as the application server, a power transaction service server managing power distribution may be used. For example, in a case where the power unit price is determined based on the power usage total amount of a plurality of houses for the first unitary time, similar to the EMS 103, the power transaction service server may receive first integrated partial information for the EMS and integrated auxiliary information for the EMS (first integrated auxiliary information for the EMS) from the first storage server 101b, receive second integrated partial information for the EMS (and second integrated auxiliary information for the EMS) from the second storage server 101c, determine the power unit price by restoring the power usage total amount of a plurality of houses for the first unitary time, and perform a transaction of the power. In addition, as the application server, a power saving application server that performs power control of each house in cooperation with the home server 102b may be used. In such a case, the power saving application server, instead of performing power control of each house using the power usage amount of each house for the first unitary time, similar to the EMS 103, may receive first integrated partial information for the EMS and integrated auxiliary information for the EMS (first integrated auxiliary information for the EMS) from the first storage server 101b, receive second integrated partial information for the EMS (and second integrated auxiliary information for the EMS) from the second storage server 101c, and perform power control of each house by using the power usage total amount of the plurality of houses for the first unitary time, which is calculated based on the plurality of pieces of first integrated partial information and (a plurality of pieces of) the integrated auxiliary information for the EMS. Alternatively, similar to the accounting server 104, the power saving application server may be configured to receive first integrated partial information for accounting (or information corresponding to first integrated partial information for accounting that is calculated based on a part of the first partial information of the second unitary time) (and first integrated auxiliary information for accounting) from the first storage server 101b, receive second integrated partial information for accounting (or information corresponding to the second integrated partial information for accounting that is calculated based on a part of the second partial information for the second unitary time) (and the second integrated auxiliary information for accounting) from the second storage server 101c, and perform power control of each house using the power usage amount of each house of the second unitary time (or a part of the second unitary time) calculated based on a plurality of pieces of second integrated partial information (or information corresponding thereto) and a plurality of pieces of integrated auxiliary information for accounting.

In addition, in the first embodiment described above, the accounting server 104 performs the accounting process based on the power usage total amount of each house for the second unitary time. In a smart grid, there are cases where the charging unit is raised (the unit price of electricity is expensive) for a time slot in which the power usage amount is large. Even when such a dynamic pricing contract (dynamic pricing) is made, the accounting process may be performed using the first partial information and the auxiliary information (first auxiliary information) stored in the first storage server 101b and the second partial information (and the second auxiliary information) stored in the second storage server 101c.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A partial information generating device comprising:
a storage configured to store a predetermined basal value;
a receiver configured to receive power usage amounts each collected for a unitary time by at least one power meter;
a first generator configured to generate a piece of first partial information from a range that is zero or more and less than the basal value for each of the power usage amounts; and
a second generator configured to generate one or more pieces of auxiliary information and a piece of second partial information for the each of the power usage amounts, by using the each of the power usage amounts, the piece of first partial information, and the basal value, wherein
a plurality of pieces of first partial information are used for acquiring first integrated partial information,
a plurality of pieces of second partial information are used for acquiring second integrated partial information,
a plurality of pieces of auxiliary information are used for acquiring integrated auxiliary information,
the pieces of first partial information are stored in a first storage device,
the pieces of second partial information are stored in a second storage device,
the pieces of auxiliary information are stored in the first storage device, the second storage device, or a third storage device,
the first integrated partial information, the second integrated partial information, the integrated auxiliary information, and the basal value are used for acquiring a total of the power usage amounts, and
the each of the power usage amounts is restorable by using all of the piece of first partial information, the piece of second partial information, and the piece of auxiliary information, and the basal value, but the each of the power usage amounts is unrestorable when there is a lack of at least one of the piece of first partial information, the piece of second partial information, and the piece of auxiliary information.

2. The device according to claim 1, wherein
the first generator and the second generator are configured to generate $d\_A$ and $d\_B$ satisfying $d\_A+d\_B=d+\alpha \times L$ for an integer $\alpha$, respectively, and
the second generator is configured to generate one or more pieces of auxiliary information $f$ or $f\_1$ and $f\_2$ satisfying $f=\alpha$ or $f\_1+f\_2=\alpha$,
where $d$ is the power usage amount, $d\_A$ represents the piece of first partial information, $d\_B$ represents the piece of second partial information, and $L$ is the basal value.

3. The device according to claim 1, wherein
the second generator is configured to generate a plurality of pieces of auxiliary information, and
the pieces of auxiliary information are stored in at least two of the first storage device, the second storage device, and the third storage device in a distributed manner.

4. A power usage amount calculation system comprising:
at least one power meter;
a receiver configured to receive power usage amounts each collected for a unitary time by the at least one power meter;
a first generator configured to generate a piece of first partial information from a range that is zero or more and less than a predetermined basal value for each of the power usage amounts;
a second generator configured to generate one or more pieces of auxiliary information and a piece of second partial information for the each of the power usage amounts, by using the each of the power usage amounts, the piece of first partial information, and the basal value;
a first storage device configured to store a plurality of pieces of first partial information;
a second storage device configured to store a plurality of pieces of second partial information;
a first calculator configured to acquire first integrated partial information by using the pieces of first partial information;
a second calculator configured to acquire second integrated partial information by using the pieces of second partial information;
a third calculator configured to acquire integrated auxiliary information by using the pieces of auxiliary information; and
a fourth calculator configured to acquire a total of the power usage amounts by using the first integrated partial information, the second integrated partial information, the integrated auxiliary information, and the basal value, wherein
the each of the power usage amounts is restorable by using all of the piece of first partial information, the piece of second partial information, and the piece of auxiliary information, and the basal value, but the each of the power usage amounts is unrestorable when there is a lack of at least one of the piece of first partial information, the piece of second partial information, and the piece of auxiliary information.

5. A partial information generating method comprising:
receiving power usage amounts each collected for a unitary time by at least one power meter;
generating a piece of first partial information from a range that is zero or more and less than a predetermined basal value stored in a storage for each of the power usage amounts; and
generating one or more pieces of auxiliary information and a piece of second partial information for the each of the power usage amounts, by using the each of the power usage amounts, the piece of first partial information, and the basal value, wherein
a plurality of pieces of first partial information are used for acquiring first integrated partial information,
a plurality of pieces of second partial information are used for acquiring second integrated partial information,
a plurality of pieces of auxiliary information are used for acquiring integrated auxiliary information,
the pieces of first partial information are stored in a first storage device,
the pieces of second partial information are stored in a second storage device,
the pieces of auxiliary information are stored in the first storage device, the second storage device, or a third storage device,
the first integrated partial information, the second integrated partial information, the integrated auxiliary information, and the basal value are used for acquiring a total of the power usage amounts, and
the each of the power usage amounts is restorable by using all of the piece of first partial information, the piece of second partial information, and the piece of auxiliary information, and the basal value, but the each of the power usage amounts is unrestorable when there is a lack of at least one of the piece of first partial information, the piece of second partial information, and the piece of auxiliary information.

6. The method according to claim 5, wherein
$d\_A$ and $d\_B$ are generated so as to satisfy $d\_A+d\_B=d+\alpha \times L$ for an integer $\alpha$, and
the generating one or more pieces of auxiliary information includes generating one or more pieces of auxiliary information f or $f\_1$ and $f\_2$ satisfying $f=\alpha$ or $f\_1+f\_2=\alpha$,
where d is the power usage amount, $d\_A$ represents the piece of first partial information, $d\_B$ represents the piece of second partial information, and L is the basal value.

7. The method according to claim 5, wherein
the generating one or more pieces of auxiliary information includes generating a plurality of pieces of auxiliary information, and
the pieces of auxiliary information are stored in at least two of the first storage device, the second storage device, and the third storage device in a distributed manner.

* * * * *